(12) United States Patent
Imaoka

(10) Patent No.: US 10,067,314 B2
(45) Date of Patent: Sep. 4, 2018

(54) LENS SYSTEM AND CAMERA SYSTEM INCLUDING THE LENS SYSTEM

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 73 days.

(21) Appl. No.: 15/403,516

(22) Filed: Jan. 11, 2017

(65) Prior Publication Data

US 2017/0212334 A1 Jul. 27, 2017

(30) Foreign Application Priority Data

Jan. 21, 2016 (JP) .................. 2016-009418
Jan. 5, 2017 (JP) .................. 2017-000317

(51) Int. Cl.
  *G02B 13/18* (2006.01)
  *G02B 3/02* (2006.01)
  *G02B 9/64* (2006.01)
  *G02B 13/08* (2006.01)
  *G02B 13/06* (2006.01)

(52) U.S. Cl.
  CPC ............... *G02B 9/64* (2013.01); *G02B 13/06* (2013.01); *G02B 13/08* (2013.01)

(58) Field of Classification Search
  CPC .................................. G02B 3/02; G02B 3/04
  USPC ......................................... 359/708, 717, 720
  See application file for complete search history.

(56) References Cited

U.S. PATENT DOCUMENTS

| | | | |
|---|---|---|---|
| 5,864,430 A | 1/1999 | Dickey et al. | |
| 6,264,332 B1 | 7/2001 | Honguh et al. | |
| 2004/0169726 A1 | 9/2004 | Moustier et al. | |
| 2005/0275939 A1 | 12/2005 | Sander | |
| 2007/0206165 A1 | 9/2007 | Yatsu et al. | |
| 2012/0212711 A1 | 8/2012 | Goto | |
| 2014/0254032 A1* | 9/2014 | Chen | H04N 5/2254 359/720 |

FOREIGN PATENT DOCUMENTS

| | | |
|---|---|---|
| JP | 11-273441 | 10/1999 |
| JP | 2004-536351 | 12/2004 |
| JP | 2006-106582 | 4/2006 |
| JP | 2007-232810 | 9/2007 |
| JP | 2009-080407 | 4/2009 |

* cited by examiner

*Primary Examiner* — William Choi
(74) *Attorney, Agent, or Firm* — Wenderoth, Lind & Ponack, L.L.P.

(57) ABSTRACT

A lens system which includes a lens group including at least one lens element and forms an image on an image sensor which is rectangular with a first side and a second side greater than or equal to the first side in length, the lens system including: in order from an object side to an image surface side, a front lens group; a diaphragm; and a rear lens group, wherein at least one of the front lens group and the rear lens group includes a freeform surface lens asymmetric about an optical axis, and the lens system satisfies 1<A/(B−C)<10000 and 1<A/(D−E)<10000.

12 Claims, 10 Drawing Sheets

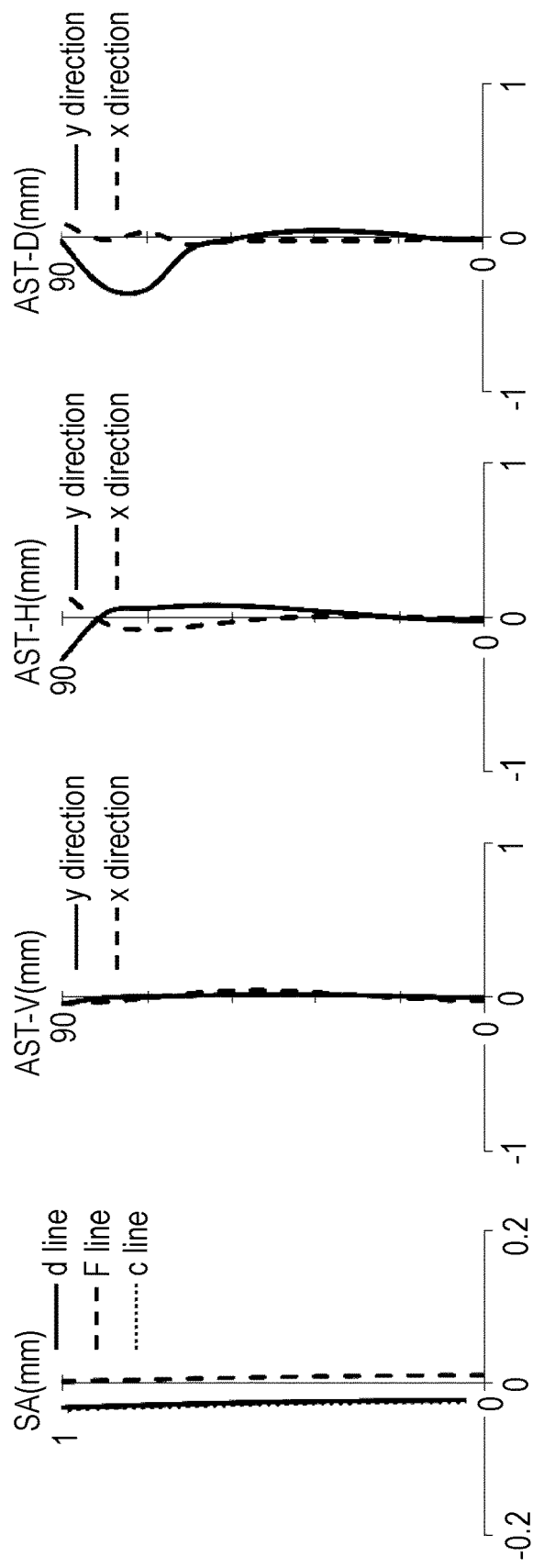

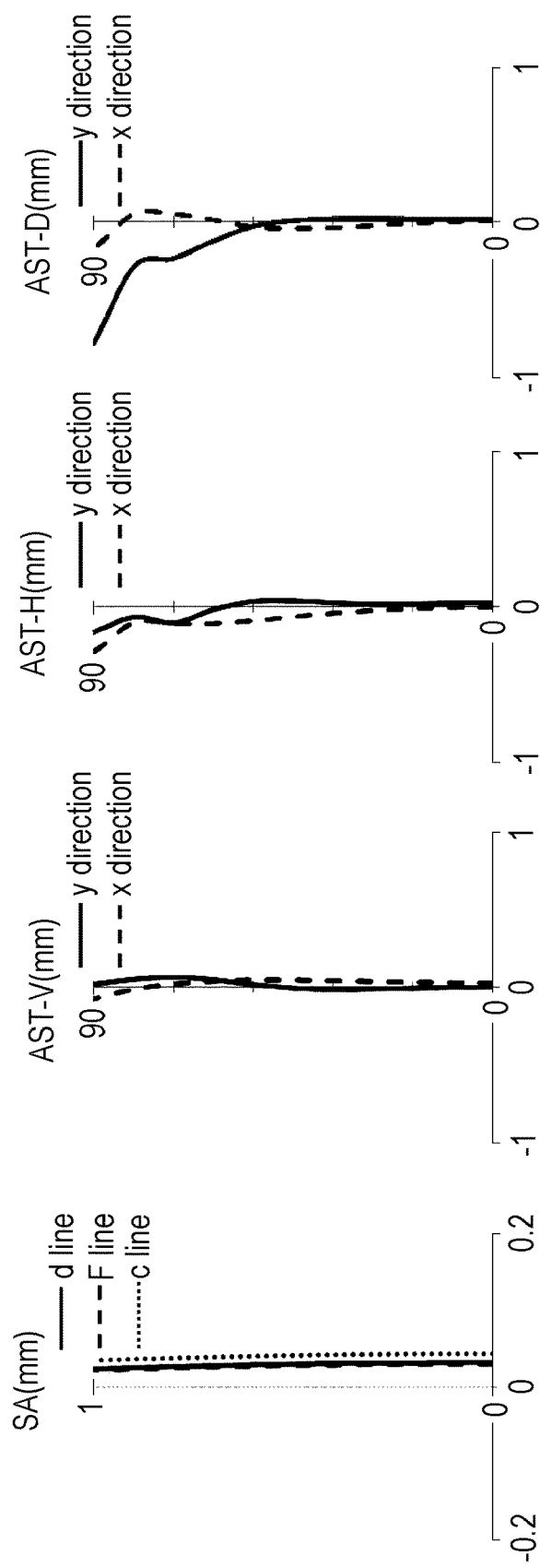

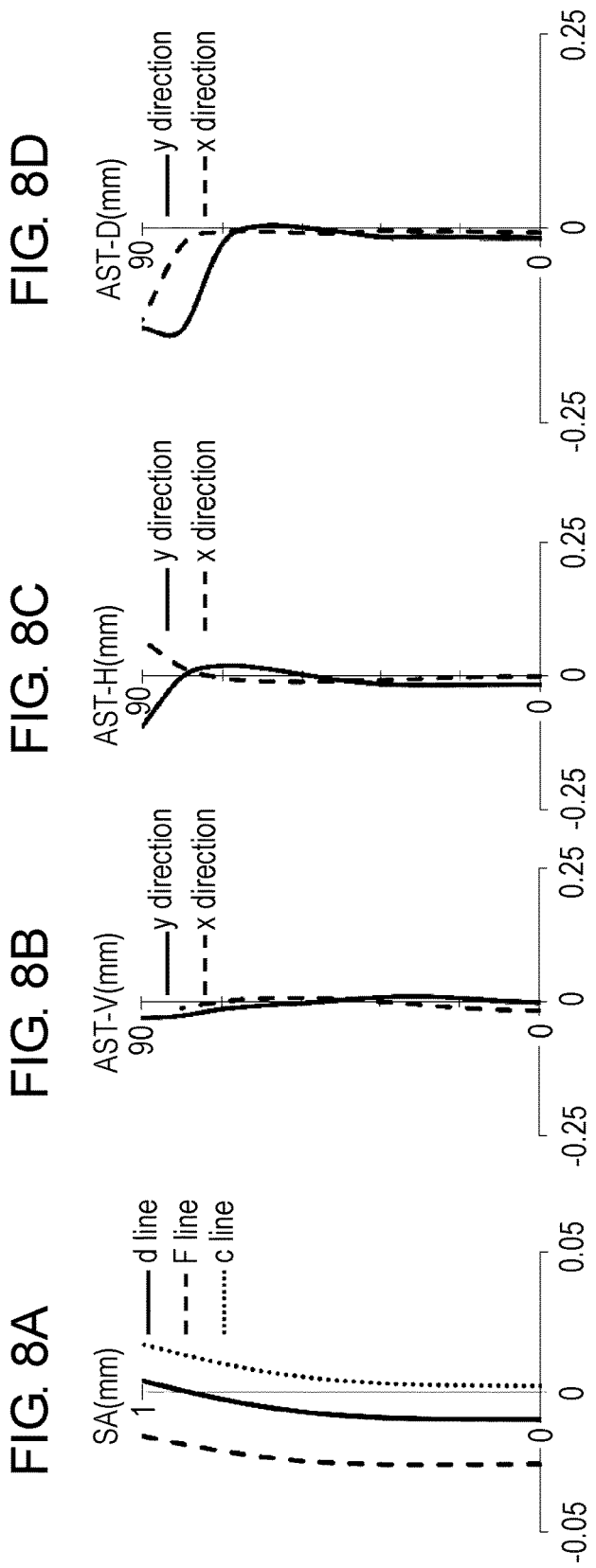

LENS SYSTEM AND CAMERA SYSTEM INCLUDING THE LENS SYSTEM

BACKGROUND

1. Technical Field

The present disclosure relates to a lens system and a camera system including the lens system.

2. Description of the Related Art

Since an image formed by a fisheye lens has a circular shape, use of a rectangular image sensor means that the region of the image sensor that overlaps with the image is small, resulting in large regions of the image sensor being unused.

Japanese Unexamined Patent Application Publication No. 2004-536351 (PTL 1) discloses a method of capturing a panoramic image using a rectangular image sensor. PTL 1 also discloses use of a toric lens as a fisheye objective lens so that rather than a circular image, an elliptical image is formed on the rectangular image sensor.

SUMMARY

Provided is a lens system which forms a substantially rectangular image and a camera system including the lens system.

The lens system according to the present disclosure is a lens system which includes a lens group including at least one lens element and forms an image on an image sensor which is rectangular with a first side and a second side greater than or equal to the first side in length, the lens system including: in order from an object side to an image surface side, a front lens group; a diaphragm; and a rear lens group, wherein at least one of the front lens group and the rear lens group includes a freeform surface lens asymmetric about an optical axis, and the lens system satisfies Condition (1) and Condition (2) below when an axis passing through the optical axis and parallel to the first side is a vertical axis, an axis passing through the optical axis and parallel to the second side is a horizontal axis, and an axis passing through the optical axis and parallel to a line diagonally joining opposite corners of the image sensor is a diagonal axis, $$1 < A/(B-C) < 10000 \quad (1)$$

$$1 < A/(D-E) < 10000 \quad (2)$$

where:

A is a value represented by [Math. 1];

$$\sum_{i=1}^{n} (ndi \cdot Lcci) \quad \text{[Math. 1]}$$

B is a value represented by [Math. 2];

$$\sum_{i=m+1}^{n} \{(ndi \cdot Lhvi) - (ndi \cdot Lvvi)\} \quad \text{[Math. 2]}$$

C is a value represented by [Math. 3];

$$\sum_{i=1}^{m} \{(ndi \cdot Lhvi) - (ndi \cdot Lvvi)\} \quad \text{[Math. 3]}$$

D is a value represented by [Math. 4];

$$\sum_{i=m+1}^{n} \{(ndi \cdot Ldhi) - (ndi \cdot Lhei)\} \quad \text{[Math. 4]}$$

E: a value represented by [Math. 5];

$$\sum_{i=1}^{m} \{(ndi \cdot Ldhi) - (ndi \cdot Lhei)\} \quad \text{[Math. 5]}$$

i is a number, indicating a position, of a freeform surface lens when freeform surface lenses are counted in order from the object side to the image surface side;

m is a number of freeform surface lenses located between an object and the diaphragm;

n is a total number of freeform surface lenses;

Lcci is a distance in an i-th freeform surface lens travelled by a principal ray forming an image at a center of the image sensor;

Lhvi is a distance in the i-th freeform surface lens travelled by a principal ray forming an image at a position away from the optical axis by Yv along the horizontal axis of the image sensor;

Lvvi is a distance in the i-th freeform surface lens travelled by a principal ray forming an image at a position away from the optical axis by Yv along the vertical axis of the image sensor;

Ldhi is a distance in the i-th freeform surface lens travelled by a principal ray forming an image at a position away from the optical axis by Yh along the diagonal axis of the image sensor;

Lhei is a distance in the i-th freeform surface lens travelled by a principal ray forming an image at a position away from the optical axis by Ye along the horizontal axis of the image sensor;

ndi is a refractive index of the i-th freeform surface lens with respect to d line;

Yv is a distance from the optical axis to the second side of the image sensor;

Yh is a distance from the optical axis to the first side of the image sensor; and $$Ye = \sqrt{((Yv^2 + Yh^2)/2)}.$$

The camera system according to the present disclosure is a camera system including: a lens system which includes a lens group including at least one lens element; and an image sensor which is rectangular with a first side and a second side greater than or equal to the first side in length, wherein the lens system includes: in order from an object side to an image surface side, a front lens group; a diaphragm; and a rear lens group, at least one of the front lens group and the rear lens group includes a freeform surface lens asymmetric about an optical axis, and the lens system satisfies Condition (1) and Condition (2) below when an axis passing through the optical axis and parallel to the first side is a vertical axis, an axis passing through the optical axis and parallel to the second side is a horizontal axis, and an axis passing through the optical axis and parallel to a line diagonally joining opposite corners of the image sensor is a diagonal axis.

$$1 < A/(B-C) < 10000 \quad (1)$$

$$1 < A/(D-E) < 10000 \quad (2)$$

According to the present disclosure, it is possible to implement a lens system which forms a substantially rectangular image and a camera system including the lens system.

BRIEF DESCRIPTION OF DRAWINGS

FIG. 2A is an aberration diagram illustrating spherical aberration in an infinite focus state of a lens system according to Numerical Example 1;

FIG. 2B is an aberration diagram illustrating astigmatism in the vertical direction in an infinite focus state of a lens system according to Numerical Example 1;

FIG. 2C is an aberration diagram illustrating astigmatism in the horizontal direction in an infinite focus state of a lens system according to Numerical Example 1;

FIG. 2D is an aberration diagram illustrating astigmatism in a diagonal direction in an infinite focus state of a lens system according to Numerical Example 1;

FIG. 4A is an aberration diagram illustrating spherical aberration in an infinite focus state of a lens system according to Numerical Example 2;

FIG. 4B is an aberration diagram illustrating astigmatism in the vertical direction in an infinite focus state of a lens system according to Numerical Example 2;

FIG. 4C is an aberration diagram illustrating astigmatism in the horizontal direction in an infinite focus state of a lens system according to Numerical Example 2;

FIG. 4D is an aberration diagram illustrating astigmatism in a diagonal direction in an infinite focus state of a lens system according to Numerical Example 2;

FIG. 8A is an aberration diagram illustrating spherical aberration in an infinite focus state of a lens system according to Numerical Example 4;

FIG. 8B is an aberration diagram illustrating astigmatism in the vertical direction in an infinite focus state of a lens system according to Numerical Example 4;

FIG. 8C is an aberration diagram illustrating astigmatism in the horizontal direction in an infinite focus state of a lens system according to Numerical Example 4;

FIG. 8D is an aberration diagram illustrating astigmatism in a diagonal direction in an infinite focus state of a lens system according to Numerical Example 4;

DETAILED DESCRIPTION

Hereinafter, non-limiting embodiments will be described in detail with reference to the drawings as necessary. However, unnecessarily detailed description may be omitted. For example, detailed descriptions of well-known aspects or repetitive descriptions of essentially the same configurations may be omitted. This is to avoid unnecessary redundancy and make the following description easier for a person skilled in the art to understand.

It should be noted that the accompanying drawings and the following description are provided, not to limit the subject matter recited in the claims, but to aid a person skilled in the art to adequately understand the present disclosure.

Embodiments 1 through 4

[1. Configurations]

Figure 1A:
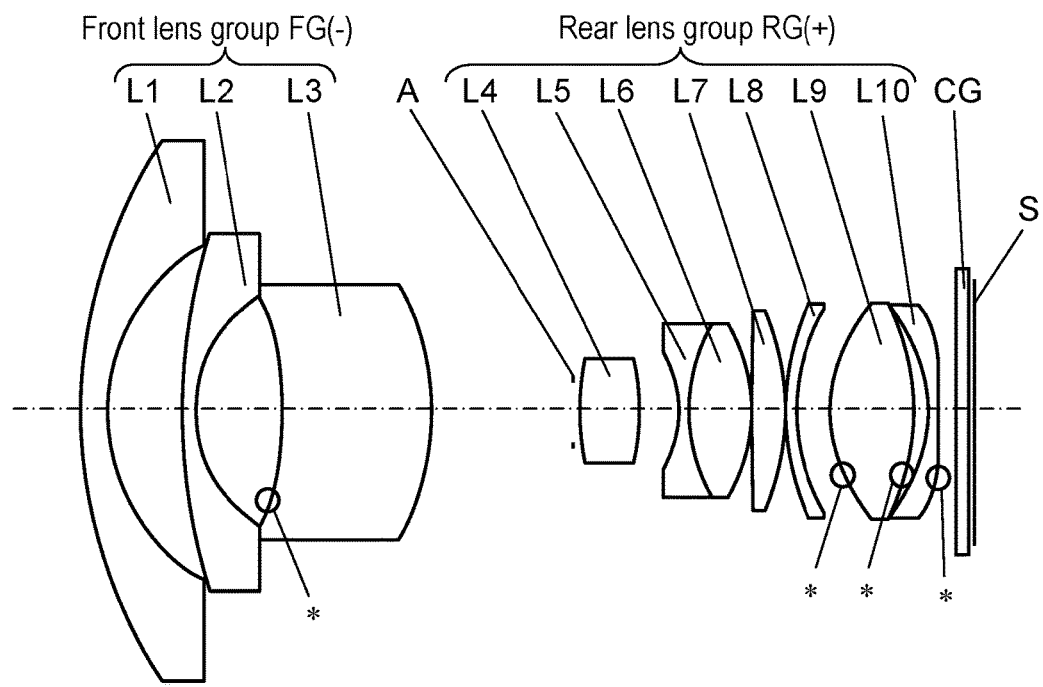
FIG. 1A is a layout of lens elements in a YZ cross section, illustrating an infinite focus state of a lens system according to Embodiment 1 (Numerical Example 1)
Figure 1B:
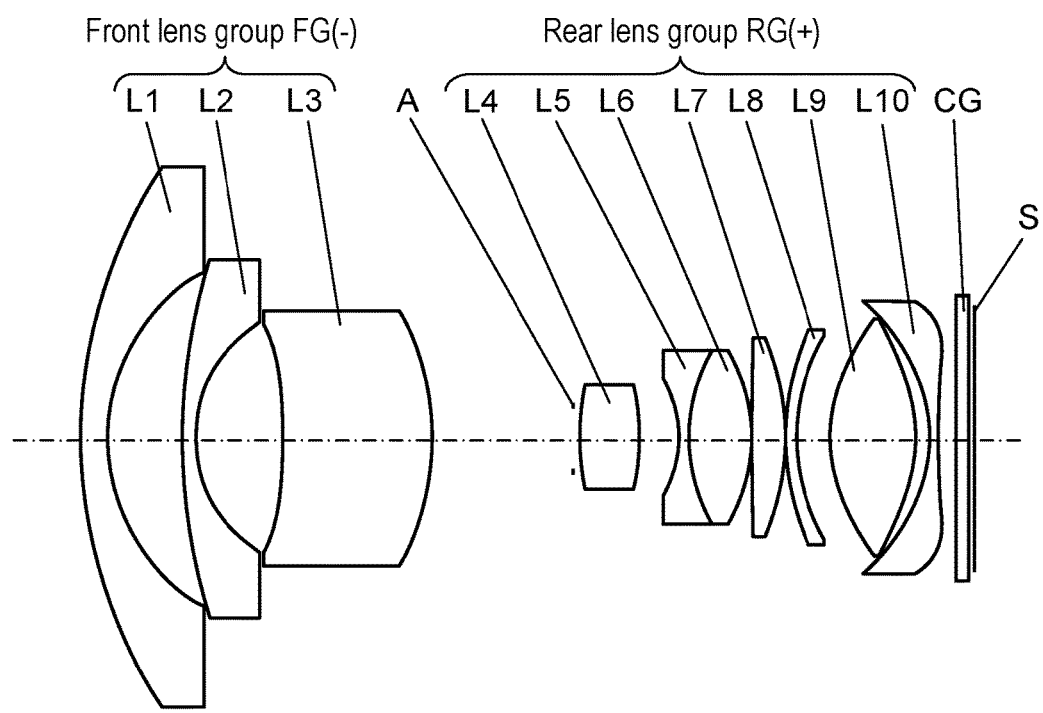
FIG. 1B is a layout of lens elements in an XZ cross section, illustrating an infinite focus state of a lens system according to Embodiment 1 (Numerical Example 1)

FIG. 1A is a layout of lens elements in a YZ cross section, illustrating an infinite focus state of a lens system according to non-limiting Embodiment 1 (Numerical Example 1). FIG. 1B is a layout of the lens elements in an XZ cross section, illustrating an infinite focus state of the lens system according to Embodiment 1 (Numerical Example 1).

Figure 3A:
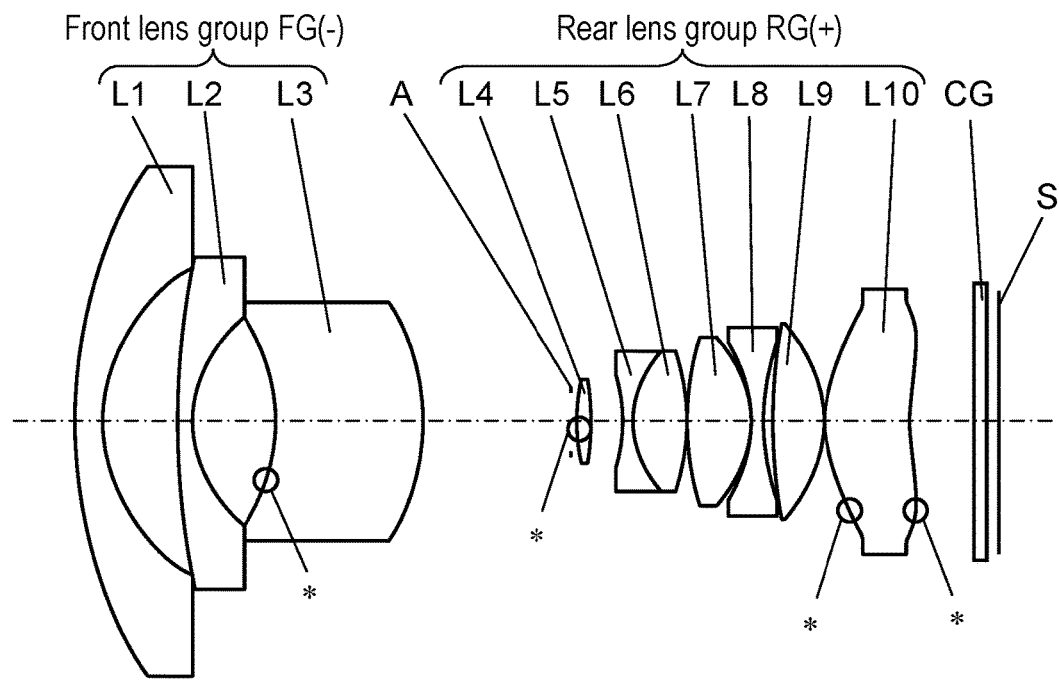
FIG. 3A is a layout of lens elements in a YZ cross section, illustrating an infinite focus state of a lens system according to Embodiment 2 (Numerical Example 2)
Figure 3B:
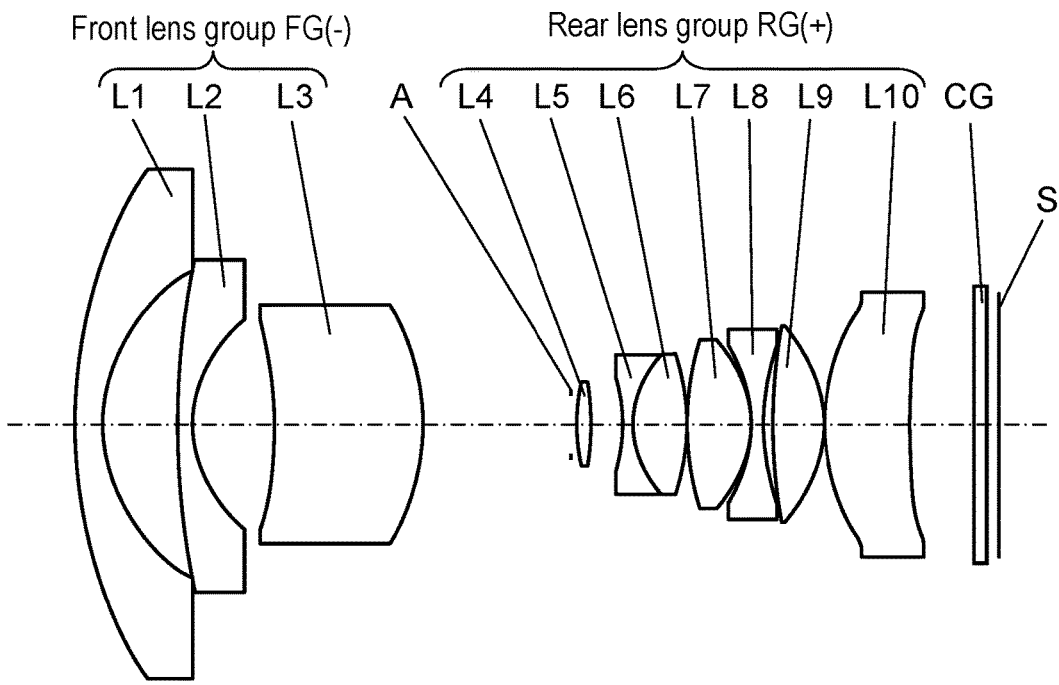
FIG. 3B is a layout of lens elements in an XZ cross section, illustrating an infinite focus state of a lens system according to Embodiment 2 (Numerical Example 2)

FIG. 3A is a layout of lens elements in a YZ cross section, illustrating an infinite focus state of a lens system according to non-limiting Embodiment 2 (Numerical Example 2). FIG. 3B is a layout of the lens elements in an XZ cross section, illustrating an infinite focus state of the lens system according to Embodiment 2 (Numerical Example 2).

Figure 5A:
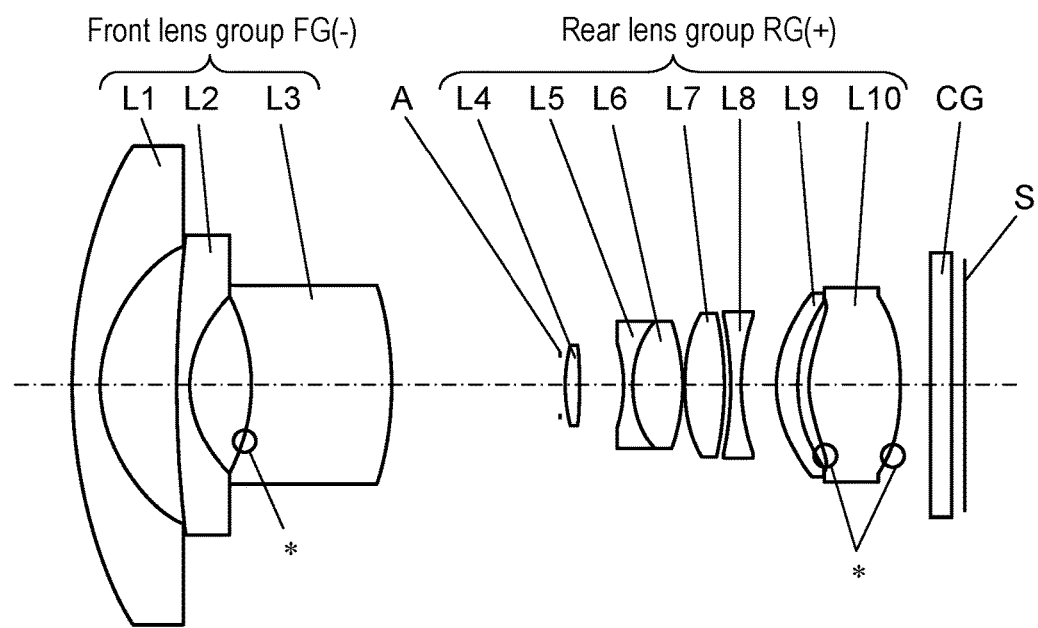
FIG. 5A is a layout of lens elements in a YZ cross section, illustrating an infinite focus state of a lens system according to Embodiment 3 (Numerical Example 3)
Figure 5B:
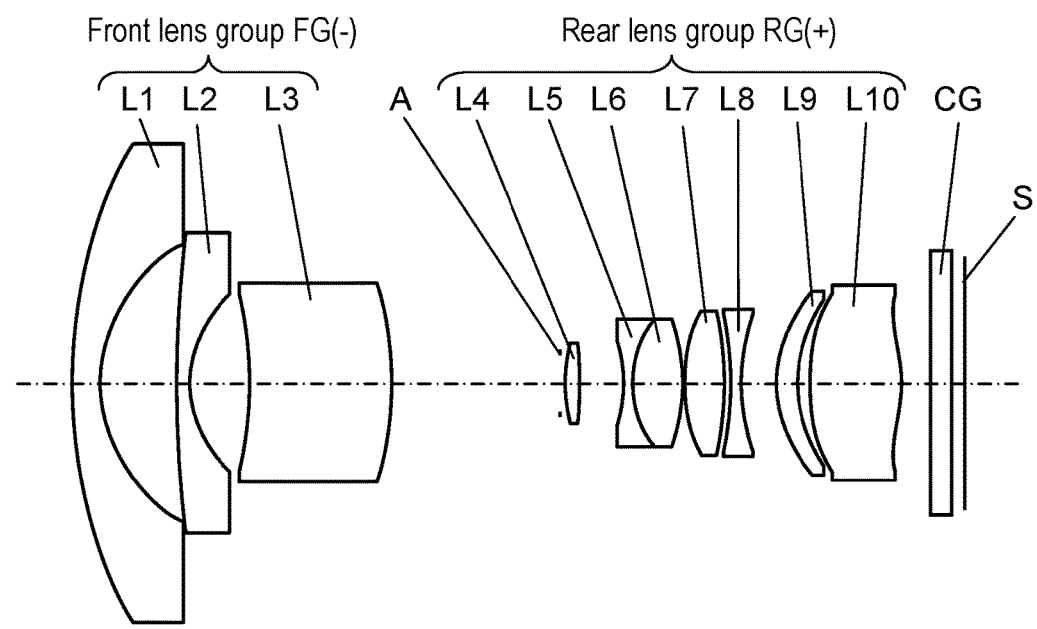
FIG. 5B is a layout of lens elements in an XZ cross section, illustrating an infinite focus state of a lens system according to Embodiment 3 (Numerical Example 3)

FIG. 5A is a layout of lens elements in a YZ cross section, illustrating an infinite focus state of a lens system according to non-limiting Embodiment 3 (Numerical Example 3). FIG. 5B is a layout of the lens elements in an XZ cross section, illustrating an infinite focus state of the lens system according to Embodiment 3 (Numerical Example 3).

Figure 7A:
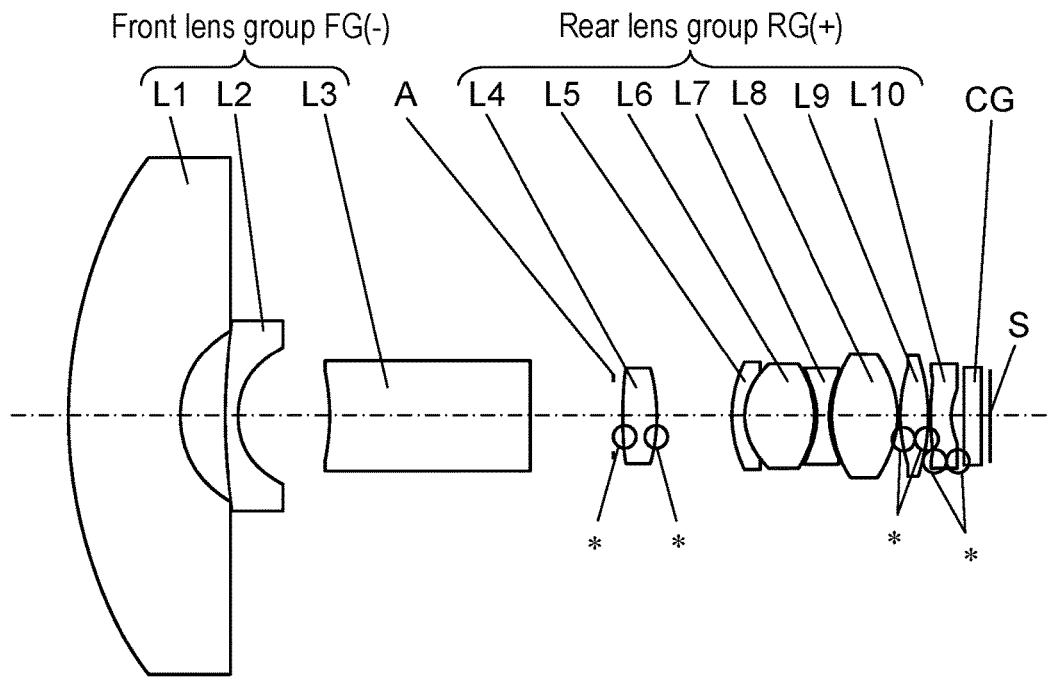
FIG. 7A is a layout of lens elements in a YZ cross section, illustrating an infinite focus state of a lens system according to Embodiment 4 (Numerical Example 4)
Figure 7B:
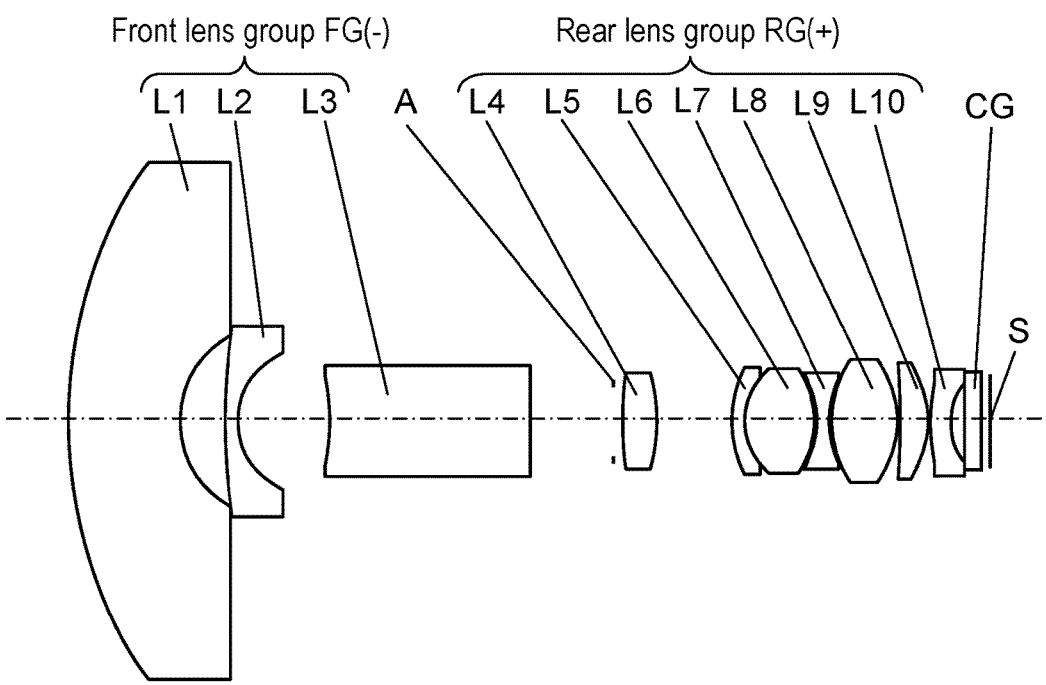
FIG. 7B is a layout of lens elements in an XZ cross section, illustrating an infinite focus state of a lens system according to Embodiment 4 (Numerical Example 4)

FIG. 7A is a layout of lens elements in a YZ cross section, illustrating an infinite focus state of a lens system according to non-limiting Embodiment 4 (Numerical Example 4). FIG. 7B is a layout of the lens elements in an XZ cross section, illustrating an infinite focus state of the lens system according to Embodiment 4 (Numerical Example 4).

Here, the X direction is a direction parallel to the long side of the image sensor, the Y direction is a direction parallel to the short side of the image sensor, and the Z direction is a direction parallel to the optical axis. The YZ cross section is a plane including the optical axis and parallel to the Y direction and the Z direction. The XZ cross section is a plane including the optical axis and parallel to the X direction and the Z direction.

Each of the lens systems according to Embodiments 1 through 4 is a lens system which forms an image on an image sensor which is rectangular with a short side (first side) and a long side (second side), and includes at least one freeform surface lens asymmetric about the optical axis.

Each of the lens systems according to Embodiments 1 through 4 includes aperture stop A, front lens group FG of lenses having negative power and located between an object and aperture stop A, and rear lens group RG of lenses having positive power and located between aperture stop A and an image surface. That is to say, the lens system according to each embodiment includes front lens group FG, aperture stop A, and rear lens group RG in order from the object side to the image surface side. With the lens system according to each embodiment, the power of the lens group closer to the object is set to negative and the power of the lens group farther away from the object is set to positive, so as to increase the angle of view. It should be noted that aperture stop A corresponds to a diaphragm according to the present disclosure. Furthermore, each of front lens group FG and rear lens group RG is a lens group including at least one lens element.

In each figure, the sign (+) or (−) given to each group corresponds to the sign of the power of that group. Cover glass CG is disposed between rear lens group RG and the image surface. Wavelength characteristics can be imparted to cover glass CG by sealing the image sensor with a transparent member or depositing a transparent film by vapor deposition. The image forming position is represented by image surface S.

Embodiment 1

As illustrated in FIG. 1A and FIG. 1B, front lens group FG of the lens system according to Embodiment 1 includes, in order from the object side to the image surface side, meniscus-shaped first lens element L1 having negative power and a convex surface facing the object, meniscus-shaped second lens element L2 having negative power and a convex surface facing the object, and meniscus-shaped third lens element L3 having positive power and a convex surface facing the image surface. The surface of third lens element L3 facing the object is a freeform surface defined by an XY polynomial.

Here, third lens element L3 is a freeform surface lens having a shape symmetric about the horizontal axis (i.e., an axis passing through the optical axis and parallel to the long side of the image sensor. The same applies hereinafter.) and the vertical axis (i.e., an axis passing through the optical axis and parallel to the short side of the image sensor. The same applies hereinafter.), and first lens element L1 and second lens element L2 are lens elements which are axially symmetric about the optical axis.

Rear lens group RG of the lens system according to Embodiment 1 includes, in order from the object side to the image surface side, biconvex fourth lens element L4, biconcave fifth lens element L5, biconvex sixth lens element L6, meniscus-shaped seventh lens element L7 having positive power and a convex surface facing the image surface, meniscus-shaped eighth lens element L8 having negative power and a convex surface facing the object, biconvex ninth lens element L9, and meniscus-shaped tenth lens element L10 having positive power and a convex surface facing the image surface. The surface of ninth lens element L9 facing the object, the surface of ninth lens element L9 facing the image surface, and the surface of tenth lens element L10 facing the image surface are freeform surfaces each defined by an XY polynomial. Among these lens elements, fifth lens element L5 and sixth lens element L6 are joined. It should be noted that the shape of each surface is a shape in the vicinity of the optical axis in the Y direction (i.e., the shape at the apex).

Here, ninth lens element L9 and tenth lens element L10 are freeform surface lenses each having a shape symmetric about the horizontal axis and the vertical axis, and fourth lens element L4, fifth lens element L5, sixth lens element L6, seventh lens element L7, and eighth lens element L8 are lens elements which are axially symmetric about the optical axis. The principal curvatures of ninth lens element L9 and tenth lens element L10 have positive power.

The lens system according to Embodiment 1 includes aperture stop A between front lens group FG and rear lens group RG.

Embodiment 2

As illustrated in FIG. 3A and FIG. 3B, front lens group FG of the lens system according to Embodiment 2 includes, in order from the object side to the image surface side, meniscus-shaped first lens element L1 having negative power and a convex surface facing the object, meniscus-shaped second lens element L2 having negative power and a convex surface facing the object, and meniscus-shaped third lens element L3 having positive power and a convex surface facing the image surface. The surface of third lens element L3 facing the object is a freeform surface defined by an XY polynomial.

Here, third lens element L3 is a freeform surface lens having a shape symmetric about the horizontal axis and the vertical axis, and first lens element L1 and second lens element L2 are lens elements which are axially symmetric about the optical axis.

Rear lens group RG of the lens system according to Embodiment 2 includes, in order from the object side to the image surface side, biconvex fourth lens element L4, biconcave fifth lens element L5, biconvex sixth lens element L6, biconvex seventh lens element L7, biconcave eighth lens element L8, biconvex ninth lens element L9, and meniscus-shaped tenth lens element L10 having positive power and a convex surface facing the object. The surface of fourth lens element L4 facing the object, the surface of tenth lens element L10 facing the object, and the surface of tenth lens element L10 facing the image surface are freeform surfaces each defined by an XY polynomial. Among these lens elements, fifth lens element L5 and sixth lens element L6 are joined. It should be noted that the shape of each surface is a shape in the vicinity of the optical axis in the Y direction (i.e., the shape at the apex).

Here, fourth lens element L4 and tenth lens element L10 are freeform surface lenses each having a shape symmetric about the horizontal axis and the vertical axis, and fifth lens element L5, sixth lens element L6, seventh lens element L7, eighth lens element L8, and ninth lens element L9 are lens elements which are axially symmetric about the optical axis. The principal curvatures of fourth lens element L4 and tenth lens element L10 have positive power. Both surfaces of tenth lens element L10, which is a freeform surface lens located closest to the image surface and having a principal curvature with positive power, are freeform surfaces.

The lens system according to Embodiment 2 includes aperture stop A between front lens group FG and rear lens group RG.

Embodiment 3

As illustrated in FIG. 5A and FIG. 5B, front lens group FG of the lens system according to Embodiment 3 includes, in order from the object side to the image surface side, meniscus-shaped first lens element L1 having negative power and a convex surface facing the object, meniscus-shaped second lens element L2 having negative power and a convex surface facing the object, and meniscus-shaped third lens element L3 having negative power and a convex surface facing the image surface. The surface of third lens element L3 facing the object is a freeform surface defined by an XY polynomial.

Here, third lens element L3 is a freeform surface lens having a shape symmetric about the horizontal axis and the vertical axis, and first lens element L1 and second lens element L2 are lens elements which are axially symmetric about the optical axis. The principal curvature of third lens element L3 has positive power.

Rear lens group RG of the lens system according to Embodiment 3 includes, in order from the object side to the image surface side, biconvex fourth lens element L4, biconcave fifth lens element L5, biconvex sixth lens element L6, biconvex seventh lens element L7, biconcave eighth lens element L8, meniscus-shaped ninth lens element L9 having positive power and a convex surface facing the object, and biconvex tenth lens element L10. The surface of tenth lens element L10 facing the object and the surface of tenth lens element L10 facing the image surface are freeform surfaces each defined by an XY polynomial. Among these lens elements, fifth lens element L5 and sixth lens element L6 are joined. It should be noted that the shape of each surface is a shape in the vicinity of the optical axis in the Y direction (i.e., the shape at the apex).

Here, tenth lens element L10 is a freeform surface lens having a shape symmetric about the horizontal axis and the vertical axis, and fourth lens element L4, fifth lens element L5, sixth lens element L6, seventh lens element L7, eighth lens element L8, and ninth lens element L9 are lens elements which are axially symmetric about the optical axis. The principal curvature of tenth lens element L10 has positive power. Both surfaces of tenth lens element L10, which is a freeform surface lens located closest to the image surface and having a principal curvature with positive power, are freeform surfaces.

The lens system according to Embodiment 3 includes aperture stop A between front lens group FG and rear lens group RG.

Embodiment 4

As illustrated in FIG. 7A and FIG. 7B, front lens group FG of the lens system according to Embodiment 4 includes, in order from the object side to the image surface side, meniscus-shaped first lens element L1 having negative power and a convex surface facing the object, meniscus-shaped second lens element L2 having negative power and a convex surface facing the object, and biconcave third lens element L3.

Here, first lens element L1, second lens element L2, and third lens element L3 are lens elements which are axially symmetric about the optical axis.

Rear lens group RG of the lens system according to Embodiment 4 includes, in order from the object side to the image surface side, biconvex fourth lens element L4, meniscus-shaped fifth lens element L5 having negative power and a convex surface facing the object, biconvex sixth lens element L6, biconcave seventh lens element L7, biconvex eighth lens element L8, biconvex ninth lens element L9, and meniscus-shaped tenth lens element L10 having positive power and a convex surface facing the object. The surface of fourth lens element L4 facing the object, the surface of fourth lens element L4 facing the image surface, the surface of tenth lens element L10 facing the object, and the surface of tenth lens element L10 facing the image surface are freeform surfaces each defined by an XY polynomial, and the surface of ninth lens element L9 facing the object and the surface of ninth lens element L9 facing the image surface are freeform surfaces each having an anamorphic shape. Among these lens elements, fifth lens element L5 and sixth lens element L6 are joined. It should be noted that the shape of each surface is a shape in the vicinity of the optical axis in the Y direction (i.e., the shape at the apex).

Here, fourth lens element L4, ninth lens element L9, and tenth lens element L10 are freeform surface lenses each having a shape symmetric about the horizontal axis and the vertical axis, and fifth lens element L5, sixth lens element L6, seventh lens element L7, and eighth lens element L8 are lens elements which are axially symmetric about the optical axis. The principal curvatures of ninth lens element L9 and tenth lens element L10 have positive power. Both surfaces of tenth lens element L10, which is a freeform surface lens located closest to the image surface and having a principal curvature with positive power, are freeform surfaces.

The lens system according to Embodiment 4 includes aperture stop A between front lens group FG and rear lens group RG.

The lens systems according to Embodiments 1 through 4 is a lens system which includes a lens group including at least one lens element and forms an image on an image sensor which is rectangular with a first side and a second side greater than or equal to the first side in length, and is a lens system including: in order from an object side to an image surface side, a front lens group; a diaphragm; and a rear lens group, and at least one of the front lens group and the rear lens group includes a freeform surface lens asymmetric about an optical axis. This configuration makes it possible to form a substantially rectangular image.

Each of the lens systems according to Embodiments 1 through 4 includes at least two lens elements which are axially symmetric about the optical axis. This configuration yields advantages of reducing the number of freeform surface lenses, reducing unevenness in performance depending on the direction, and reducing the computation time in designing.

With the lens systems according to Embodiments 1 through 4, the freeform surfaces of the freeform surface lenses each have a shape symmetric about the horizontal axis and the vertical axis, and thus the center of the freeform surface can be identified. As such, there is an advantage that the shapes can be easily controlled at the time of manufacturing.

With the lens systems according to Embodiments 1 through 4, the principal curvature of at least one freeform surface lens included in the rear lens group has positive power. This yields an advantage that there is no need to increase the positive power of other lens elements included in the rear lens group, making it possible to reduce aberration which occurs when a lens element in the rear lens group is decentered.

With the lens systems according to Embodiments 1 through 4, the front lens group includes, in order from the object, a meniscus-shaped first lens element having negative power and having a convex shape on the object side and a meniscus-shaped second lens element having negative power and having a convex shape on the object side. This configuration enables collection of light incident at wide angles, thereby making it easier for the lens system to be a wide-angle lens system. Furthermore, there is an advantage that by providing two lens elements with negative power in a row, the negative power of each lens element can be reduced, and thus each lens element can have a shape that allows easily manufacturing.

With the lens systems according to Embodiments 2 through 4, both surfaces of the freeform surface lens located closest to the image surface and having a principal curvature with positive power are freeform surfaces. Thus, the rays in the respective directions are each controlled at the surface of the lens element to travel in an arbitrary direction. This yields an advantage of facilitating image height position control and aberration reduction.

With the lens systems according to Embodiments 1 through 3, the front lens group and the rear lens group each include at least one freeform surface lens. This therefore yields an advantage of reducing field curvature in each direction.

With the lens system according to Embodiment 3, the principal curvature of at least one freeform surface lens included in the front lens group has negative power. Thus, there is no need to increase the negative power of other lens elements included in the front lens group and having negative power, which makes it possible to reduce aberration that occurs when a lens element in the front lens group is decentered. This, as a result, yields an advantage of easy manufacturing.

Each of the lens systems according to Embodiments 1 through 4 is a fisheye lens system having a half angle of view greater than or equal to 80 degrees, and thus a wide angle of view can be covered. In the case of a fisheye lens, image forming is generally difficult in the vicinity of the four corners of the image sensor. However, use of a freeform surface lens according to the present disclosure makes image forming possible even in the vicinity of the four corners of the image sensor.

For example, like the lens systems according to Embodiments 1 through 4, a lens system including a front lens group, a diaphragm, and a rear lens group in order from the object, and at least one of the front lens group and the rear lens group includes at least one freeform surface lens asymmetric about the optical axis (hereinafter this lens system configuration is referred to as the basic configuration according to the embodiments) preferably satisfies Condition (1) and Condition (2) below.

Figure 9:
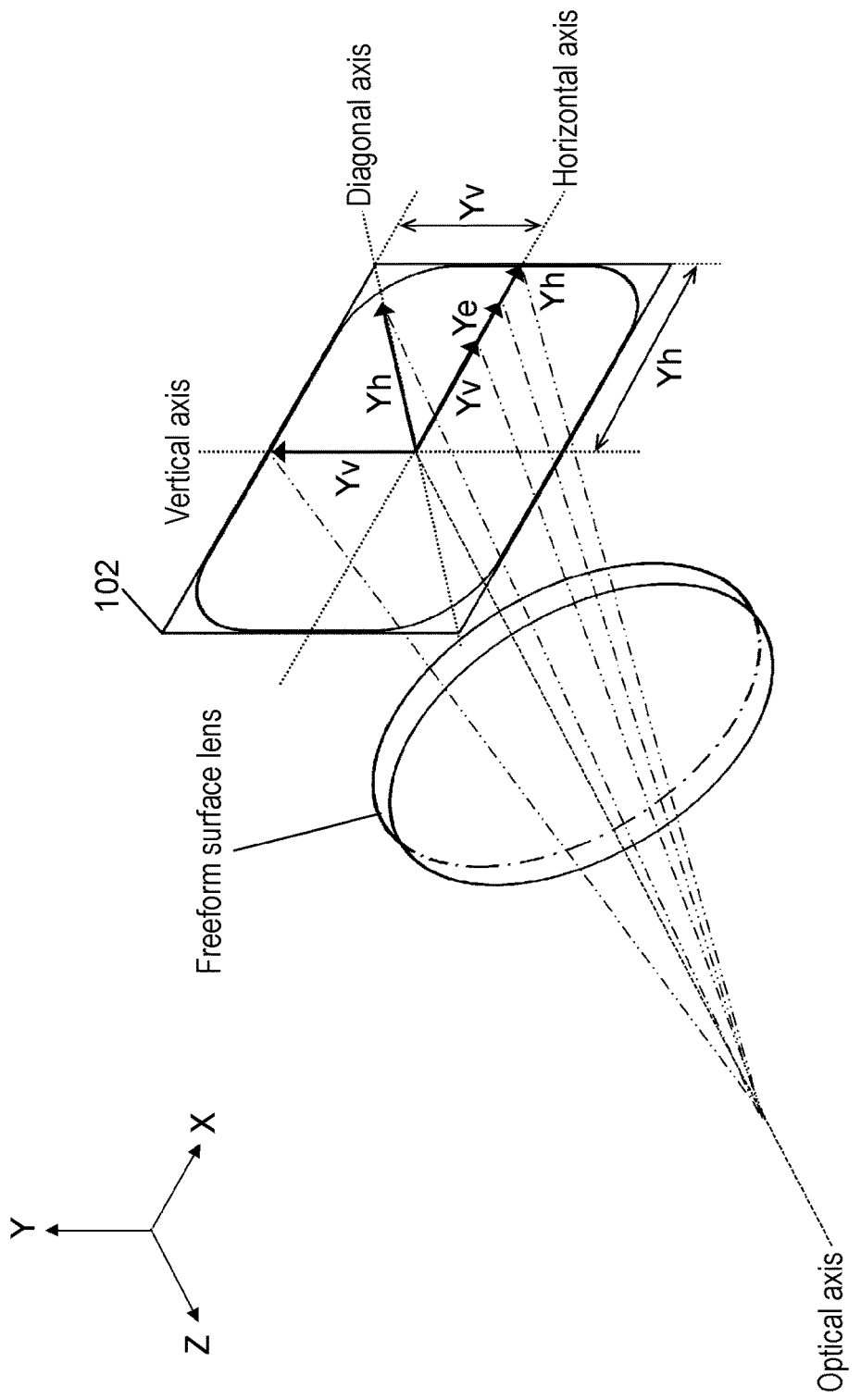
FIG. 9 is a schematic configuration diagram for describing light passing through a freeform surface lens of a lens system according to the present disclosure.

FIG. 9 is a schematic configuration diagram for describing light passing through a freeform surface lens of the lens system according to the present disclosure.

As illustrated in FIG. 9, the axis passing through the optical axis and parallel to the short side of image sensor 102 is the vertical axis, the axis passing through the optical axis and parallel to the long side of image sensor 102 is the horizontal axis, and the axis passing through the optical axis and parallel to a line diagonally joining opposite corners of image sensor 102 is the diagonal axis.

$$1 < A/(B-C) < 10000 \quad (1)$$

$$1 < A/(D-E) < 10000 \quad (2)$$

where:

A is a value represented by [Math. 1];

$$\sum_{i=1}^{n} (ndi \cdot Lcci) \quad \text{[Math. 1]}$$

B is a value represented by [Math. 2];

$$\sum_{i=m+1}^{n} \{(ndi \cdot Lhvi) - (ndi \cdot Lvvi)\} \quad \text{[Math. 2]}$$

C is a value represented by [Math. 3];

$$\sum_{i=1}^{m} \{(ndi \cdot Lhvi) - (ndi \cdot Lvvi)\} \quad \text{[Math. 3]}$$

D is a value represented by [Math. 4];

$$\sum_{i=m+1}^{n} \{(ndi \cdot Ldhi) - (ndi \cdot Lhei)\} \quad \text{[Math. 4]}$$

E is a value represented by [Math. 5];

$$\sum_{i=1}^{m} \{(ndi \cdot Ldhi) - (ndi \cdot Lhei)\} \quad \text{[Math. 5]}$$

i is a number, indicating a position, of a freeform surface lens when freeform surface lenses are counted in order from the object side to the image surface side;

m is the number of freeform surface lenses included in the front lens group (located between the object and the diaphragm);

n is the number of freeform surface lenses included in the front lens group and the rear lens group (a total number of freeform surface lenses);

Lcci is a distance in an i-th freeform surface lens travelled by a principal ray forming an image at the center of the image sensor;

Lhvi is a distance in the i-th freeform surface lens travelled by a principal ray forming an image at a position away from the optical axis of the image sensor by Yv on a plane including the horizontal axis and perpendicular to the image sensor (a distance in the i-th freeform surface lens travelled by a principal ray forming an image at a position away from the optical axis by Yv along the horizontal axis of the image sensor);

Lvvi is a distance in the i-th freeform surface lens travelled by a principal ray forming an image at a position away from the optical axis of the image sensor by Yv on a plane including the vertical axis and perpendicular to the image sensor (a distance in the i-th freeform surface lens travelled by a principal ray forming an image at a position away from the optical axis by Yv along the vertical axis of the image sensor);

Ldhi is a distance in the i-th freeform surface lens travelled by a principal ray forming an image at a position away from the optical axis of the image sensor by Yh on a plane including the diagonal axis and perpendicular to the image sensor (a distance in the i-th freeform surface lens travelled by a principal ray forming an image at a position away from the optical axis by Yh along the diagonal axis of the image sensor);

Lhei is a distance in the i-th freeform surface lens travelled by a principal ray forming an image at a position away from the optical axis of the image sensor by Ye on a plane including the horizontal axis and perpendicular to the image sensor (a distance in the i-th freeform surface lens travelled by a principal ray forming an image at a position away from the optical axis by Ye along the horizontal axis of the image sensor);

ndi is the refractive index of the i-th freeform surface lens with respect to d line;

Yv is the distance from the optical axis to the long side of the image sensor;

Yh is the distance from the optical axis to the short side of the image sensor; and $$Ye=\sqrt{((Yv^2+Yh^2)/2)}.$$

Condition (1) and Condition (2) are to be satisfied for defining the material and the shape of a given freeform surface lens.

Condition (1) defines the material and the shape of a given freeform surface lens according to: an optical path length in the freeform surface lens travelled by a principal ray which forms an image at a position away from the center of image sensor 102 by Yv along the horizontal axis; an optical path length in the freeform surface lens travelled by a principal ray which forms an image at a position away from the center of image sensor 102 by Yv along the vertical axis; and an optical path length in the freeform surface lens travelled by a principal ray which forms an image along the optical axis. The denominator is the difference between the optical path length in the freeform surface lens travelled by a ray reaching the horizontal axis and the optical path length in the freeform surface lens travelled by a ray reaching the vertical axis. The sign for the optical path length before the diaphragm is negative, whereas the sign for the optical path length after the diaphragm is positive. There is no difference in optical path length when there is no freeform surface lens before and after the diaphragm. Below the lower limit of Condition (1), the image in the horizontal direction becomes large relative to the image sensor in the horizontal direction, or the image in the vertical direction becomes small relative to the image sensor in the vertical direction. Conversely, above the upper limit of Condition (1), the image in the horizontal direction becomes small relative to the image sensor in the horizontal direction, or the image in the vertical direction becomes large relative to the image sensor in the vertical direction. That is to say, by satisfying Condition (1), it is possible to make the size of each of the image in the horizontal direction and the image in the vertical direction substantially comparable to the size of the image sensor. In other words, an image of the subject can be efficiently formed in the effective region of the rectangular image sensor.

It should be noted that further satisfying at least one of Condition (1a) and Condition (1b) below makes it possible to yield the above described advantageous effect to a greater extent.

$$5<A/(B-C) \tag{1a}$$

$$A/(B-C)<100 \tag{1b}$$

Condition (2) defines the material and the shape of a given freeform surface lens according to: an optical path length in the freeform surface lens travelled by a principal ray which forms an image at a position away from the center of image sensor 102 by Yh along the diagonal axis; an optical path length in the freeform surface lens travelled by a principal ray which forms an image at a position away from the center of image sensor 102 by Ye along the horizontal axis; and an optical path length in the freeform surface lens travelled by a principal ray which forms an image along the optical axis. The denominator is the difference between the optical path length in the freeform surface lens travelled by a ray reaching the diagonal axis and the optical path length in the freeform surface lens travelled by a ray reaching the horizontal axis. The sign for the optical path length before the diaphragm is negative, whereas the sign for the optical path length after the diaphragm is positive. There is no difference in optical path length when there is no freeform surface lens before and after the diaphragm.

Below the lower limit of Condition (2), the image in the diagonal direction becomes large relative to the image sensor in the diagonal direction, or the image in the horizontal direction becomes small relative to the image sensor in the horizontal direction. Conversely, above the upper limit, the image in the diagonal direction becomes small relative to the image sensor in the diagonal direction, or the image in the horizontal direction becomes large relative to the image sensor in the horizontal direction. That is to say, by satisfying Condition (2), it is possible to make the size of each of the image in the diagonal direction and the image in the horizontal direction substantially comparable to the size of the image sensor. In other words, an image of the subject can be efficiently formed in the effective region of the rectangular image sensor.

It should be noted that further satisfying at least one of Condition (2a) and Condition (2b) below makes it possible to yield the above described advantageous effect to a greater extent.

$$10<A/(D-E) \tag{2a}$$

$$A/(D-E)<1000 \tag{2b}$$

For example, like the lens systems according to Embodiments 1 through 4, the lens system having the basic configuration preferably satisfies Condition (3) below.

$$1<A/(F-G)<10000 \tag{3}$$

where:

F is a value represented by [Math. 6];

$$\sum_{i=m+1}^{n} \{(ndi \cdot Ldhi) - (ndi \cdot Lhhi)\} \qquad [\text{Math. 6}]$$

G is a value represented by [Math. 7];

$$\sum_{i=1}^{m} \{(ndi \cdot Ldhi) - (ndi \cdot Lhhi)\} \qquad [\text{Math. 7}]$$

and

Lhhi is a distance in the i-th freeform surface lens travelled by a principal ray forming an image at a position away from the optical axis by Yh along the horizontal axis of the image sensor (a distance in the i-th freeform surface lens travelled by a principal ray forming an image at a position away from the optical axis of the image sensor by Yh on a plane including the horizontal axis and perpendicular to the image sensor).

Condition (3) is to be satisfied for defining the material and the shape of a given freeform surface lens.

Condition (3) defines the material and the shape of a freeform surface lens according to: an optical path length in the freeform surface lens travelled by a principal ray which forms an image at a position away from the optical axis by Yh along the diagonal axis; an optical path length in the freeform surface lens travelled by a principal ray which forms an image at a position away from the optical axis by Yh along the horizontal axis of image sensor 102; and an optical path length in the freeform surface lens travelled by a principal ray which forms an image along the optical axis. The denominator is the difference between the optical path length in the freeform surface lens travelled by a ray reaching the diagonal axis and the optical path length in the freeform surface lens travelled by a ray reaching the horizontal axis. The sign for the optical path length before the diaphragm is negative, whereas the sign for the optical path length after the diaphragm is positive. There is no difference in optical path length when there is no freeform surface lens before and after the diaphragm. Below the lower limit of Condition (3), the image in the diagonal direction becomes large relative to the image sensor in the diagonal direction, or the image in the horizontal direction becomes small relative to the image sensor in the horizontal direction. Conversely, above the upper limit of Condition (3), the image in the diagonal direction becomes small relative to the image sensor in the diagonal direction, or the image in the horizontal direction becomes large relative to the image sensor in the horizontal direction. That is to say, by satisfying Condition (3), it is possible to make the size of each of the image in the diagonal direction and the image in the horizontal direction substantially comparable to the size of the image sensor. In other words, an image of the subject can be efficiently formed in the effective region of the rectangular image sensor.

It should be noted that further satisfying at least one of Condition (3a) and Condition (3b) below makes it possible to yield the above described advantageous effect to a greater extent.

$$10 < A/(F-G) \tag{3a}$$

$$A/(F-G) < 500 \tag{3b}$$

For example, like the lens systems according to Embodiments 1 through 4, the lens system having the basic configuration preferably satisfies Condition (4) below.

$$0.1 < Lsi/Ltt < 0.7 \tag{4}$$

where:

Lsi is the distance from the diaphragm to the image sensor; and

Ltt is the distance from a lens surface which is, among the lens surfaces included in the lens system, located closest to the object to the image sensor.

Here, the distance refers to a distance along the optical axis.

Condition (4) defines the relationship between the position of the diaphragm and the overall length of the optical system. Below the lower limit of Condition (4), the angle of the ray incident on the image sensor becomes too large, causing shading. Conversely, above the upper limit, the lens group on the image surface side becomes too large.

It should be noted that further satisfying at least one of Condition (4a) and Condition (4b) below makes it possible to yield the above described advantageous effect to a greater extent.

$$0.3 < Lsi/Ltt \tag{4a}$$

$$Lsi/Ltt < 0.6 \tag{4b}$$

Although the lens elements included in the lens systems according to

Embodiments 1 through 4 are all refracting lens elements which deflect incident rays by refraction (that is, a type of lens element which deflects rays at the interface between mediums having different refractive indices), the present disclosure is not limited to refracting lens elements. For example, such lens elements as follows may be included in each lens group: a diffractive lens element which deflects incident rays by diffraction, a hybrid refractive-diffractive lens element which deflects incident rays by a combination of a diffraction effect and a refraction effect, and a gradient index lens element which deflects incident rays by refractive index distribution in a medium. In particular, with the hybrid refractive-diffractive lens element, a diffraction structure may be formed at the interface between mediums having different refractive indices because the diffraction structure allows the diffraction efficiency to be less wavelength-dependent.

Although the lens systems according to Embodiments 1 through 4 have been described as lens systems that form an image on an image sensor which is rectangular with a short side and a long side, the present disclosure is not limited to this. For example, the image sensor may have a substantially square shape with the lengths of two sides being substantially equal. In this case, it is only necessary to apply Conditions (1) through (3) with one side regarded as the short side and the other side regarded as the long side.

Embodiment 5

Figure 10:
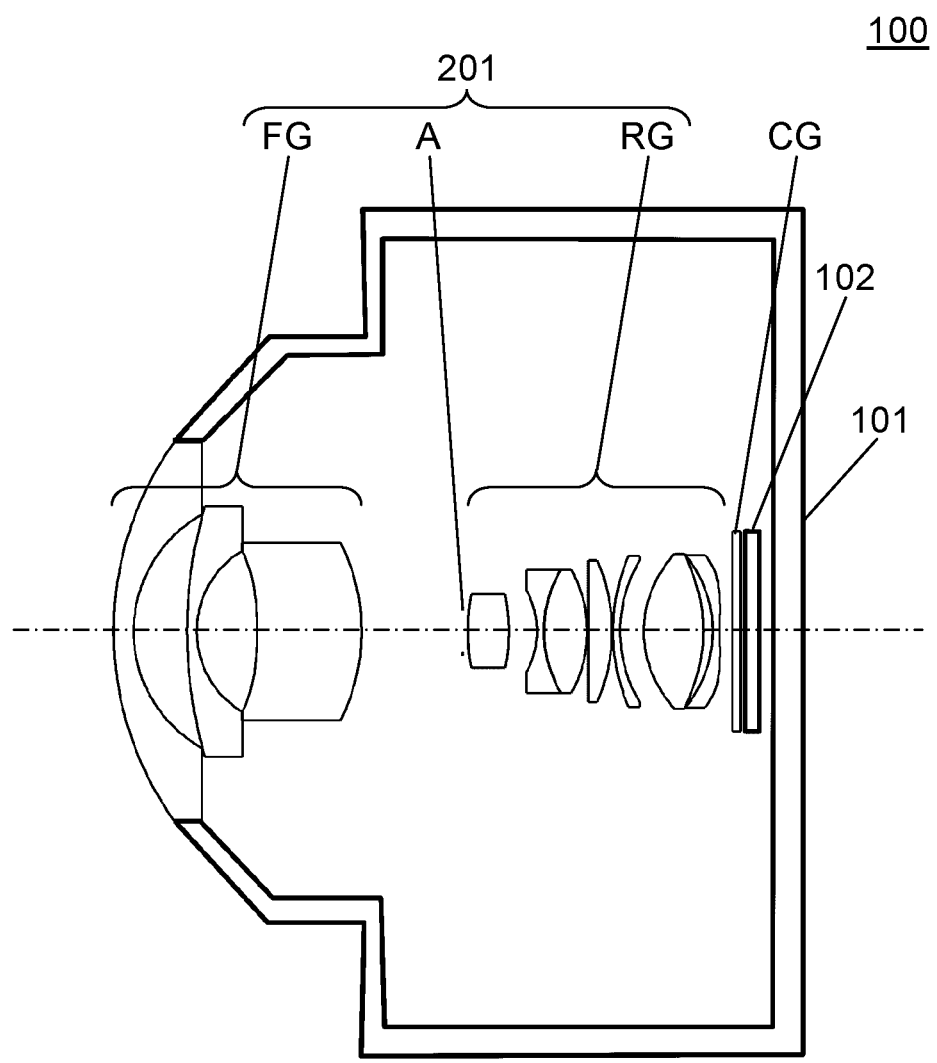
FIG. 10 is a schematic configuration diagram of a camera system according to Embodiment 5.

FIG. 10 is a schematic configuration diagram of a camera system according to Embodiment 5. Camera system 100 according to the present embodiment includes: camera body 101; image sensor 102 which receives an optical image formed by lens system 201 and converts the optical image into an electrical image signal; lens system 201 according to any one of Embodiments 1 through 4; and cover glass CG. It should be noted that FIG. 10 illustrates the case where the lens system according to Embodiment 1 is used as lens system 201.

Since Embodiment 5 uses lens system 201 according to any one of Embodiments 1 through 4, it is possible to implement a camera system capable of forming a substantially rectangular image on image sensor 102 and generating an image with a greater number of pixels.

The following describes numerical examples in which the lens systems according to Embodiments 1 through 4 have been specifically implemented. It should be noted that in each numerical example, the unit of length is "mm" and the unit of angle of view is "°" throughout the tables. Furthermore, in each numerical example, r refers to curvature radius, d refers to surface spacing, nd refers to refractive index relative to d line, and vd refers to Abbe number relative to d line. Moreover, in each numerical example, the surface denoted with * is an anamorphic freeform surface or a freeform surface defined by an XY polynomial. The amount of sag z of the anamorphic freeform surface parallel to the Z axis is defined by [Math 8], and the amount of sag z of the freeform surface defined by an XY polynomial and parallel to the Z axis is defined by [Math 9].

$$z = \frac{(CUX)x^2 + (CUY)y^2}{1 + \sqrt{1 - (CUX)^2 x^2 - (CUY)^2 y^2}} \quad \text{[Math. 8]}$$

where:
CUX is the curvature in the x direction; and
CUY is the curvature in the y direction.

$$z = \frac{cr^2}{1 + \sqrt{1 - (1+k)c^2 r^2}} + \sum_{j=2}^{66} c_j x^p y^q \quad \text{[Math. 9]}$$

$$j = \frac{(p+q)^2 + p + 3q}{2} + 1$$

where:
c is an apex curvature (CUY);
k(c1) is a conic constant; and
$c_j$ is a coefficient of an $x^p y^q$ polynomial.

FIG. 2A is an aberration diagram illustrating spherical aberration in an infinite focus state of a lens system according to Numerical Example 1. FIG. 2B is an aberration diagram illustrating astigmatism in the vertical direction in an infinite focus state of the lens system according to Numerical Example 1. FIG. 2C is an aberration diagram illustrating astigmatism in the horizontal direction in an infinite focus state of the lens system according to Numerical Example 1. FIG. 2D is an aberration diagram illustrating astigmatism in the diagonal direction in an infinite focus state of the lens system according to Numerical Example 1.

FIG. 4A is an aberration diagram illustrating spherical aberration in an infinite focus state of a lens system according to Numerical Example 2. FIG. 4B is an aberration diagram illustrating astigmatism in the vertical direction in an infinite focus state of the lens system according to Numerical Example 2. FIG. 4C is an aberration diagram illustrating astigmatism in the horizontal direction in an infinite focus state of the lens system according to Numerical Example 2. FIG. 4D is an aberration diagram illustrating astigmatism in the diagonal direction in an infinite focus state of the lens system according to Numerical Example 2.

Figures 6A, 6B, 6C, 6D:
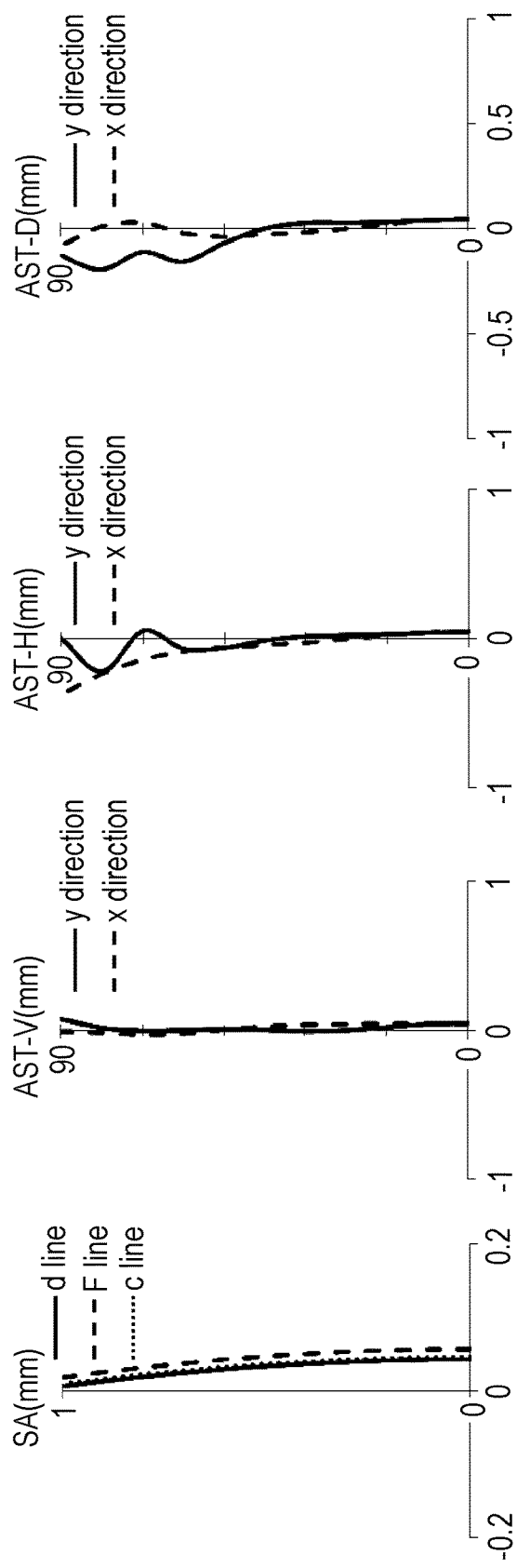
FIG. 6A is an aberration diagram illustrating spherical aberration in an infinite focus state of a lens system according to Numerical Example 3.
FIG. 6B is an aberration diagram illustrating astigmatism in the vertical direction in an infinite focus state of a lens system according to Numerical Example 3.
FIG. 6C is an aberration diagram illustrating astigmatism in the horizontal direction in an infinite focus state of a lens system according to Numerical Example 3.
FIG. 6D is an aberration diagram illustrating astigmatism in a diagonal direction in an infinite focus state of a lens system according to Numerical Example 3.

FIG. 6A is an aberration diagram illustrating spherical aberration in an infinite focus state of a lens system according to Numerical Example 3. FIG. 6B is an aberration diagram illustrating astigmatism in the vertical direction in an infinite focus state of the lens system according to Numerical Example 3. FIG. 6C is an aberration diagram illustrating astigmatism in the horizontal direction in an infinite focus state of the lens system according to Numerical Example 3. FIG. 6D is an aberration diagram illustrating astigmatism in the diagonal direction in an infinite focus state of the lens system according to Numerical Example 3.

FIG. 8A is an aberration diagram illustrating spherical aberration in an infinite focus state of a lens system according to Numerical Example 4. FIG. 8B is an aberration diagram illustrating astigmatism in the vertical direction in an infinite focus state of the lens system according to Numerical Example 4. FIG. 8C is an aberration diagram illustrating astigmatism in the horizontal direction in an infinite focus state of the lens system according to Numerical Example 4. FIG. 8D is an aberration diagram illustrating astigmatism in the diagonal direction in an infinite focus state of the lens system according to Numerical Example 4.

Here, for the spherical aberration and the astigmatism, spherical aberration (SA (mm)), astigmatism in the vertical direction (AST-V (mm)), astigmatism in the horizontal direction (AST-H (mm)), and astigmatism in the diagonal direction (AST-D (mm)) are shown. In the aberration diagrams illustrating spherical aberration, the vertical axis represents the level of eyesight, the solid line represents the characteristics of d line, the short dashed line represents the characteristics of C line, and the long dashed line represents the characteristics of F line. In the aberration diagrams illustrating astigmatism, the vertical axis represents the angle of view, the solid line represents the characteristics of the YZ plane (shown as y in the figures), and the dashed line represents the characteristics of the XZ plane (shown as x in the figures).

It should be noted that since Embodiments 1 through 4 only use the even-numbered terms of x and y in the XY polynomial, there is symmetry about the x axis and the y axis, and thus the astigmatism AST-D in the diagonal direction is the same in any direction.

NUMERICAL EXAMPLE 1

The lens system according to Numerical Example 1 corresponds to the lens system according to Embodiment 1 illustrated in FIG. 1A and FIG. 1B. Surface data on the lens system according to Numerical Example 1 are shown in Table 1, various data are shown in Table 2, and freeform surface data on the fifth surface, the seventeenth surface, the eighteenth surface, and the twentieth surface are shown in Table 3, Table 4, Table 5, and Table 6, respectively.

TABLE 1

| s | Type of surface | r | d | nd | vd |
|---|---|---|---|---|---|
| 1 | Spherical surface | 37.907 | 2.300 | 1.85000 | 24.0 |
| 2 | Spherical surface | 15.576 | 6.154 | | |
| 3 | Spherical surface | 52.060 | 1.100 | 1.72500 | 54.0 |
| 4 | Spherical surface | 10.914 | 6.972 | | |
| 5 | XY polynomial surface | −34.072 | 12.000 | 1.84191 | 25.4 |
| 6 | Spherical surface | −22.949 | 11.655 | | |
| 7 | Flat surface | Diaphragm | 0.542 | | |
| 8 | Spherical surface | 21.580 | 4.749 | 1.82541 | 38.7 |
| 9 | Spherical surface | −20.934 | 3.242 | | |
| 10 | Spherical surface | −9.636 | 0.800 | 1.84701 | 24.1 |
| 11 | Spherical surface | 14.033 | 4.969 | 1.68585 | 56.7 |
| 12 | Spherical surface | −14.694 | 0.150 | | |
| 13 | Spherical surface | −961.724 | 2.677 | 1.66157 | 58.8 |
| 14 | Spherical surface | −21.012 | 0.150 | | |
| 15 | Spherical surface | 22.674 | 0.800 | 1.85000 | 24.0 |
| 16 | Spherical surface | 16.000 | 2.720 | | |
| 17 | XY polynomial surface | 14.609 | 6.850 | 1.64559 | 60.3 |
| 18 | XY polynomial surface | −17.340 | 1.098 | | |
| 19 | Spherical surface | −13.863 | 0.800 | 1.85000 | 24.0 |
| 20 | XY polynomial surface | −13.129 | 1.431 | | |
| 21 | Flat surface | | 1.000 | 1.51680 | 64.2 |
| 22 | Flat surface | | 0.500 | | |

TABLE 2

| | |
|---|---|
| Focal length | 4.284 |
| F-number | 3.60 |
| Half angle of view | 90° |
| Front lens group focal length | −26.872 |
| Rear lens group focal length | 14.683 |
| Horizontal image height Yh | 8.652 |
| Vertical image height Yv | 6.489 |
| Diagonal image height Yd | 10.815 |

TABLE 2-continued

TABLE 3 s5

| | |
|---|---|
| C1 | 0.00000E+00 |
| C2 | 0.00000E+00 |
| C3 | 0.00000E+00 |
| C4 | 1.39535E−03 |
| C5 | 0.00000E+00 |
| C6 | 6.87808E−04 |
| C7 | 0.00000E+00 |
| C8 | 0.00000E+00 |
| C9 | 0.00000E+00 |
| C10 | 0.00000E+00 |
| C11 | −5.22762E−05 |
| C12 | 0.00000E+00 |
| C13 | −1.18010E−04 |
| C14 | 0.00000E+00 |
| C15 | −6.21768E−05 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 2.89748E−07 |
| C23 | 0.00000E+00 |
| C24 | 3.08295E−06 |
| C25 | 0.00000E+00 |
| C26 | 2.97880E−06 |
| C27 | 0.00000E+00 |
| C28 | 1.02157E−07 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.58022E−09 |
| C38 | 0.00000E+00 |
| C39 | −4.01969E−08 |
| C40 | 0.00000E+00 |
| C41 | −1.35572E−08 |
| C42 | 0.00000E+00 |
| C43 | −4.02735E−08 |
| C44 | 0.00000E+00 |
| C45 | −2.20460E−09 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −7.43875E−14 |
| C57 | 0.00000E+00 |
| C58 | 1.48216E−10 |
| C59 | 0.00000E+00 |
| C60 | 1.28173E−11 |
| C61 | 0.00000E+00 |
| C62 | 5.93905E−11 |
| C63 | 0.00000E+00 |
| C64 | 7.00388E−11 |
| C65 | 0.00000E+00 |
| C66 | 8.39549E−12 |

TABLE 4 s17

| | |
|---|---|
| C1 | 0.00000E+00 |
| C2 | 0.00000E+00 |
| C3 | 0.00000E+00 |
| C4 | 3.20312E−03 |
| C5 | 0.00000E+00 |
| C6 | 5.52511E−03 |
| C7 | 0.00000E+00 |
| C8 | 0.00000E+00 |
| C9 | 0.00000E+00 |
| C10 | 0.00000E+00 |
| C11 | −1.72740E−05 |
| C12 | 0.00000E+00 |
| C13 | −1.01942E−06 |
| C14 | 0.00000E+00 |
| C15 | 1.19870E−06 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −2.89823E−07 |
| C23 | 0.00000E+00 |
| C24 | −8.17902E−07 |
| C25 | 0.00000E+00 |
| C26 | −3.53973E−07 |
| C27 | 0.00000E+00 |
| C28 | 1.29778E−08 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 0.00000E+00 |
| C38 | 0.00000E+00 |
| C39 | 0.00000E+00 |
| C40 | 0.00000E+00 |
| C41 | 0.00000E+00 |
| C42 | 0.00000E+00 |
| C43 | 0.00000E+00 |
| C44 | 0.00000E+00 |
| C45 | 0.00000E+00 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 0.00000E+00 |
| C65 | 0.00000E+00 |
| C66 | 0.00000E+00 |

TABLE 5 s18

| | |
|---|---|
| C1 | 0.00000E+00 |
| C2 | 0.00000E+00 |
| C3 | 0.00000E+00 |
| C4 | −4.84311E−03 |

TABLE 5-continued s18

| | |
|---|---|
| C5 | 0.00000E+00 |
| C6 | 3.28604E−03 |
| C7 | 0.00000E+00 |
| C8 | 0.00000E+00 |
| C9 | 0.00000E+00 |
| C10 | 0.00000E+00 |
| C11 | −2.66148E−06 |
| C12 | 0.00000E+00 |
| C13 | 8.22931E−06 |
| C14 | 0.00000E+00 |
| C15 | −9.40082E−05 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 5.26235E−07 |
| C23 | 0.00000E+00 |
| C24 | 1.60203E−06 |
| C25 | 0.00000E+00 |
| C26 | 2.87258E−06 |
| C27 | 0.00000E+00 |
| C28 | 1.37254E−06 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 0.00000E+00 |
| C38 | 0.00000E+00 |
| C39 | 0.00000E+00 |
| C40 | 0.00000E+00 |
| C41 | 0.00000E+00 |
| C42 | 0.00000E+00 |
| C43 | 0.00000E+00 |
| C44 | 0.00000E+00 |
| C45 | 0.00000E+00 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 0.00000E+00 |
| C65 | 0.00000E+00 |
| C66 | 0.00000E+00 |

TABLE 6 s20

| | |
|---|---|
| C1 | 0.00000E+00 |
| C2 | 0.00000E+00 |
| C3 | 0.00000E+00 |
| C4 | 4.71454E−02 |
| C5 | 0.00000E+00 |
| C6 | 4.23639E−02 |
| C7 | 0.00000E+00 |
| C8 | 0.00000E+00 |
| C9 | 0.00000E+00 |
| C10 | 0.00000E+00 |
| C11 | −2.40939E−05 |
| C12 | 0.00000E+00 |
| C13 | 9.73394E−05 |
| C14 | 0.00000E+00 |
| C15 | −2.63520E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 8.39667E−07 |
| C23 | 0.00000E+00 |
| C24 | 1.75718E−06 |
| C25 | 0.00000E+00 |
| C26 | 2.10466E−05 |
| C27 | 0.00000E+00 |
| C28 | −1.18372E−06 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.02319E−08 |
| C38 | 0.00000E+00 |
| C39 | 4.60151E−08 |
| C40 | 0.00000E+00 |
| C41 | 4.27963E−07 |
| C42 | 0.00000E+00 |
| C43 | −5.08139E−07 |
| C44 | 0.00000E+00 |
| C45 | 1.70185E−08 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −2.43730E−11 |
| C57 | 0.00000E+00 |
| C58 | −1.17159E−09 |
| C59 | 0.00000E+00 |
| C60 | −1.05547E−09 |
| C61 | 0.00000E+00 |
| C62 | −4.09766E−09 |
| C63 | 0.00000E+00 |
| C64 | 2.65419E−09 |
| C65 | 0.00000E+00 |
| C66 | −1.19566E−11 |

NUMERICAL EXAMPLE 2

The lens system according to Numerical Example 2 corresponds to the lens system according to Embodiment 2 illustrated in FIG. 3A and FIG. 3B. Surface data on the lens system according to Numerical Example 2 are shown in Table 7, various data are shown in Table 8, and freeform surface data on the fifth surface, the eighth surface, the nineteenth surface, and the twentieth surface are shown in Table 9, Table 10, Table 11, and Table 12, respectively.

TABLE 7

| s | Type of surface | r | d | nd | vd |
|---|---|---|---|---|---|
| 1 | Spherical surface | 39.743 | 2.300 | 1.83518 | 37.9 |
| 2 | Spherical surface | 14.530 | 6.179 | | |
| 3 | Spherical surface | 65.801 | 1.100 | 1.72500 | 54.0 |
| 4 | Spherical surface | 10.625 | 6.819 | | |
| 5 | XY polynomial surface | −20.666 | 12.000 | 1.68134 | 41.9 |
| 6 | Spherical surface | −19.515 | 12.336 | | |
| 7 | Flat surface | Diaphragm | 0.500 | | |
| 8 | XY polynomial surface | 68.740 | 1.184 | 1.77739 | 44.3 |
| 9 | Spherical surface | −21.805 | 2.625 | | |
| 10 | Spherical surface | −12.865 | 0.800 | 1.72500 | 54.0 |
| 11 | Spherical surface | 8.592 | 4.325 | 1.50089 | 59.8 |
| 12 | Spherical surface | −23.150 | 0.150 | | |
| 13 | Spherical surface | 27.706 | 5.168 | 1.53840 | 66.9 |
| 14 | Spherical surface | −9.671 | 0.150 | | |
| 15 | Spherical surface | −11.459 | 0.800 | 1.84996 | 24.1 |
| 16 | Spherical surface | 20.399 | 0.840 | | |
| 17 | Spherical surface | 53.417 | 4.187 | 1.61976 | 63.0 |
| 18 | Spherical surface | −11.520 | 0.150 | | |
| 19 | XY polynomial surface | 15.914 | 6.907 | 1.74075 | 50.5 |
| 20 | XY polynomial surface | −11.308 | 5.319 | | |
| 21 | Flat surface | | 1.000 | 1.51680 | 64.2 |
| 22 | Flat surface | | 1.000 | | |

TABLE 8

| | |
|---|---|
| Focal length | 1.892 |
| F-number | 3.60 |
| Half angle of view | 90° |
| Front lens group focal length | −17.015 |
| Rear lens group focal length | 8.476 |
| Horizontal image height Yh | 8.652 |
| Vertical image height Yv | 6.489 |
| Diagonal image height Yd | 10.815 |

TABLE 9 s5

| | |
|---|---|
| C1 | 0.00000E+00 |
| C2 | 0.00000E+00 |
| C3 | 0.00000E+00 |
| C4 | 7.89476E−03 |
| C5 | 0.00000E+00 |
| C6 | 3.71530E−03 |
| C7 | 0.00000E+00 |
| C8 | 0.00000E+00 |
| C9 | 0.00000E+00 |
| C10 | 0.00000E+00 |
| C11 | 2.99988E−05 |
| C12 | 0.00000E+00 |
| C13 | 1.37401E−04 |
| C14 | 0.00000E+00 |
| C15 | −7.97496E−05 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −2.90221E−07 |
| C23 | 0.00000E+00 |
| C24 | −1.09811E−06 |
| C25 | 0.00000E+00 |
| C26 | −1.40442E−06 |
| C27 | 0.00000E+00 |
| C28 | −8.33367E−07 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |

TABLE 9-continued s5

| | |
|---|---|
| C36 | 0.00000E+00 |
| C37 | 0.00000E+00 |
| C38 | 0.00000E+00 |
| C39 | 0.00000E+00 |
| C40 | 0.00000E+00 |
| C41 | 0.00000E+00 |
| C42 | 0.00000E+00 |
| C43 | 0.00000E+00 |
| C44 | 0.00000E+00 |
| C45 | 0.00000E+00 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 0.00000E+00 |
| C65 | 0.00000E+00 |
| C66 | 0.00000E+00 |

TABLE 10 s8

| | |
|---|---|
| C1 | 0.00000E+00 |
| C2 | 0.00000E+00 |
| C3 | 0.00000E+00 |
| C4 | 2.00000E−02 |
| C5 | 0.00000E+00 |
| C6 | 1.91798E−02 |
| C7 | 0.00000E+00 |
| C8 | 0.00000E+00 |
| C9 | 0.00000E+00 |
| C10 | 0.00000E+00 |
| C11 | 0.00000E+00 |
| C12 | 0.00000E+00 |
| C13 | 0.00000E+00 |
| C14 | 0.00000E+00 |
| C15 | 0.00000E+00 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 0.00000E+00 |
| C23 | 0.00000E+00 |
| C24 | 0.00000E+00 |
| C25 | 0.00000E+00 |
| C26 | 0.00000E+00 |
| C27 | 0.00000E+00 |
| C28 | 0.00000E+00 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 0.00000E+00 |
| C38 | 0.00000E+00 |
| C39 | 0.00000E+00 |

TABLE 10-continued s8

| | |
|---|---|
| C40 | 0.00000E+00 |
| C41 | 0.00000E+00 |
| C42 | 0.00000E+00 |
| C43 | 0.00000E+00 |
| C44 | 0.00000E+00 |
| C45 | 0.00000E+00 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 0.00000E+00 |
| C65 | 0.00000E+00 |
| C66 | 0.00000E+00 |

TABLE 11 s19

| | |
|---|---|
| C1 | 0.00000E+00 |
| C2 | 0.00000E+00 |
| C3 | 0.00000E+00 |
| C4 | −6.79037E−03 |
| C5 | 0.00000E+00 |
| C6 | 8.45244E−03 |
| C7 | 0.00000E+00 |
| C8 | 0.00000E+00 |
| C9 | 0.00000E+00 |
| C10 | 0.00000E+00 |
| C11 | 3.45044E−06 |
| C12 | 0.00000E+00 |
| C13 | 1.97528E−04 |
| C14 | 0.00000E+00 |
| C15 | −3.38603E−05 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 3.77071E−07 |
| C23 | 0.00000E+00 |
| C24 | 4.27062E−06 |
| C25 | 0.00000E+00 |
| C26 | 2.20075E−06 |
| C27 | 0.00000E+00 |
| C28 | −6.16069E−07 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −3.47413E−09 |
| C38 | 0.00000E+00 |
| C39 | −5.44191E−08 |
| C40 | 0.00000E+00 |
| C41 | −7.26313E−08 |
| C42 | 0.00000E+00 |
| C43 | 7.53630E−08 |

TABLE 11-continued s19

| | |
|---|---|
| C44 | 0.00000E+00 |
| C45 | −4.18877E−09 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 3.55566E−10 |
| C59 | 0.00000E+00 |
| C60 | 4.57517E−10 |
| C61 | 0.00000E+00 |
| C62 | −9.12121E−11 |
| C63 | 0.00000E+00 |
| C64 | 0.00000E+00 |
| C65 | 0.00000E+00 |
| C66 | 0.00000E+00 |

TABLE 12 s20

| | |
|---|---|
| C1 | 0.00000E+00 |
| C2 | 0.00000E+00 |
| C3 | 0.00000E+00 |
| C4 | 4.16639E−02 |
| C5 | 0.00000E+00 |
| C6 | 7.15474E−02 |
| C7 | 0.00000E+00 |
| C8 | 0.00000E+00 |
| C9 | 0.00000E+00 |
| C10 | 0.00000E+00 |
| C11 | 2.58097E−04 |
| C12 | 0.00000E+00 |
| C13 | 1.17738E−03 |
| C14 | 0.00000E+00 |
| C15 | −1.25485E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.93010E−06 |
| C23 | 0.00000E+00 |
| C24 | 1.31712E−05 |
| C25 | 0.00000E+00 |
| C26 | 1.13855E−05 |
| C27 | 0.00000E+00 |
| C28 | −4.71216E−06 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.51610E−08 |
| C38 | 0.00000E+00 |
| C39 | −1.33670E−08 |
| C40 | 0.00000E+00 |
| C41 | −2.18584E−08 |
| C42 | 0.00000E+00 |
| C43 | 3.52717E−07 |
| C44 | 0.00000E+00 |
| C45 | 4.46250E−08 |
| C46 | 0.00000E+00 |
| C47 | 0.00000E+00 |

TABLE 12-continued

| | s20 |
|---|---|
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 0.00000E+00 |
| C65 | 0.00000E+00 |
| C66 | 0.00000E+00 |

NUMERICAL EXAMPLE 3

The lens system according to Numerical Example 3 corresponds to the lens system according to Embodiment 3 illustrated in FIG. 5A and FIG. 5B. Surface data on the lens system according to Numerical Example 3 are shown in Table 13, various data are shown in Table 14, and freeform surface data on the fifth surface, the nineteenth surface, and the twentieth surface are shown in Table 15, Table 16, and Table 17, respectively.

TABLE 13

| s | Type of surface | r | d | nd | vd |
|---|---|---|---|---|---|
| 1 | Spherical surface | 43.473 | 2.300 | 1.80127 | 41.3 |
| 2 | Spherical surface | 13.707 | 6.445 | | |
| 3 | Spherical surface | 135.801 | 1.100 | 1.62000 | 63.0 |
| 4 | Spherical surface | 10.292 | 5.000 | | |
| 5 | XY polynomial surface | −11.261 | 12.000 | 1.56943 | 65.2 |
| 6 | Spherical surface | −28.446 | 14.024 | | |
| 7 | Flat surface | Diaphragm | 0.500 | | |
| 8 | Spherical surface | 12.764 | 1.307 | 1.74120 | 27.5 |
| 9 | Spherical surface | −34.230 | 3.692 | | |
| 10 | Spherical surface | −12.373 | 0.800 | 1.83562 | 27.6 |
| 11 | Spherical surface | 9.283 | 4.108 | 1.62410 | 62.5 |
| 12 | Spherical surface | −14.842 | 0.150 | | |
| 13 | Spherical surface | 13.629 | 3.300 | 1.57831 | 64.8 |
| 14 | Spherical surface | −29.310 | 0.647 | | |
| 15 | Spherical surface | −26.467 | 0.800 | 1.85000 | 24.0 |
| 16 | Spherical surface | 15.777 | 3.000 | | |
| 17 | Spherical surface | 11.113 | 1.750 | 1.59428 | 38.1 |
| 18 | Spherical surface | 11.871 | 1.104 | | |
| 19 | XY polynomial surface | 11.783 | 7.598 | 1.72497 | 54.0 |
| 20 | XY polynomial surface | −11.030 | 2.376 | | |
| 21 | Flat surface | | 2.000 | 1.51680 | 64.2 |
| 22 | Flat surface | | 1.000 | | |

TABLE 14

| | |
|---|---|
| Focal length | 2.707 |
| F-number | 3.60 |
| Half angle of view | 90° |
| Front lens group focal length | −7.511 |
| Rear lens group focal length | 20.993 |
| Horizontal image height Yh | 9.673 |
| Vertical image height Yv | 4.837 |
| Diagonal image height Yd | 10.815 |

TABLE 15

| | s5 |
|---|---|
| C1 | 0.00000E+00 |
| C2 | 0.00000E+00 |
| C3 | 0.00000E+00 |
| C4 | 2.55287E−02 |
| C5 | 0.00000E+00 |
| C6 | 2.00087E−02 |
| C7 | 0.00000E+00 |
| C8 | 0.00000E+00 |
| C9 | 0.00000E+00 |
| C10 | 0.00000E+00 |
| C11 | 2.17266E−04 |
| C12 | 0.00000E+00 |
| C13 | 6.65171E−04 |
| C14 | 0.00000E+00 |
| C15 | 6.02073E−05 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −8.56430E−07 |
| C23 | 0.00000E+00 |
| C24 | −5.36751E−06 |
| C25 | 0.00000E+00 |
| C26 | −1.27011E−05 |
| C27 | 0.00000E+00 |
| C28 | −1.73128E−06 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 6.24952E−09 |
| C38 | 0.00000E+00 |
| C39 | 4.02629E−08 |
| C40 | 0.00000E+00 |
| C41 | 2.36062E−07 |
| C42 | 0.00000E+00 |
| C43 | 2.57284E−07 |
| C44 | 0.00000E+00 |
| C45 | 1.74079E−08 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 4.01370E−11 |
| C57 | 0.00000E+00 |
| C58 | 1.14336E−10 |
| C59 | 0.00000E+00 |
| C60 | 2.76824E−10 |
| C61 | 0.00000E+00 |
| C62 | −5.21768E−09 |
| C63 | 0.00000E+00 |
| C64 | −3.58208E−09 |
| C65 | 0.00000E+00 |
| C66 | −2.92313E−11 |

TABLE 16

| | s19 |
|---|---|
| C1 | 0.00000E+00 |
| C2 | 0.00000E+00 |
| C3 | 0.00000E+00 |
| C4 | −1.13349E−02 |

TABLE 16-continued s19

| | |
|---|---|
| C5 | 0.00000E+00 |
| C6 | −6.11651E−04 |
| C7 | 0.00000E+00 |
| C8 | 0.00000E+00 |
| C9 | 0.00000E+00 |
| C10 | 0.00000E+00 |
| C11 | −2.57230E−05 |
| C12 | 0.00000E+001 |
| C13 | 3.12939E−04 |
| C14 | 0.00000E+00 |
| C15 | −5.44493E−05 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 3.01759E−07 |
| C23 | 0.00000E+00 |
| C24 | −6.48819E−07 |
| C25 | 0.00000E+00 |
| C26 | −9.33772E−06 |
| C27 | 0.00000E+00 |
| C28 | −6.53990E−06 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −2.23286E−08 |
| C38 | 0.00000E+00 |
| C39 | −9.30232E−09 |
| C40 | 0.00000E+00 |
| C41 | −2.00479E−07 |
| C42 | 0.00000E+00 |
| C43 | 1.49605E−07 |
| C44 | 0.00000E+00 |
| C45 | 9.43157E−08 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −2.44691E−11 |
| C57 | 0.00000E+00 |
| C58 | −2.95354E−10 |
| C59 | 0.00000E+00 |
| C60 | −6.36479E−09 |
| C61 | 0.00000E+00 |
| C62 | 1.89019E−08 |
| C63 | 0.00000E+00 |
| C64 | −1.28923E−08 |
| C65 | 0.00000E+00 |
| C66 | −2.08727E−09 |

TABLE 17 s20

| | |
|---|---|
| C1 | 0.00000E+00 |
| C2 | 0.00000E+00 |
| C3 | 0.00000E+00 |
| C4 | 1.50182E−03 |
| C5 | 0.00000E+00 |
| C6 | 2.36933E−02 |
| C7 | 0.00000E+00 |
| C8 | 0.00000E+00 |

TABLE 17-continued s20

| | |
|---|---|
| C9 | 0.00000E+00 |
| C10 | 0.00000E+00 |
| C11 | 9.59499E−04 |
| C12 | 0.00000E+00 |
| C13 | 2.98163E−03 |
| C14 | 0.00000E+00 |
| C15 | 3.38829E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −4.32922E−06 |
| C23 | 0.00000E+00 |
| C24 | 3.04337E−06 |
| C25 | 0.00000E+00 |
| C26 | −1.78085E−05 |
| C27 | 0.00000E+00 |
| C28 | −1.50889E−05 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 4.76835E−08 |
| C38 | 0.00000E+00 |
| C39 | 6.89424E−08 |
| C40 | 0.00000E+00 |
| C41 | −8.51338E−07 |
| C42 | 0.00000E+00 |
| C43 | −1.12981E−06 |
| C44 | 0.00000E+00 |
| C45 | 1.71276E−07 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −4.08048E−10 |
| C57 | 0.00000E+00 |
| C58 | −6.80238E−10 |
| C59 | 0.00000E+00 |
| C60 | −1.12218E−08 |
| C61 | 0.00000E+00 |
| C62 | 6.44663E−08 |
| C63 | 0.00000E+00 |
| C64 | 1.07072E−08 |
| C65 | 0.00000E+00 |
| C66 | −7.59494E−10 |

NUMERICAL EXAMPLE 4

The lens system according to Numerical Example 4 corresponds to the lens system according to Embodiment 4 illustrated in FIG. 7A and FIG. 7B. Surface data on the lens system according to Numerical Example 4 are shown in Table 18, various data are shown in Table 19, freeform surface data on the eighth surface, the ninth surface, the nineteenth surface, and the twentieth surface are shown in Table 20, Table 21, Table 22, and Table 23, respectively, and anamorphic surface data on the seventeenth surface and the eighteenth surface are shown in Table 24 and Table 25, respectively.

TABLE 18

| s | Type of surface | r | d | nd | vd |
|---|---|---|---|---|---|
| 1 | Spherical surface | 27.842 | 6.598 | 1.84511 | 36.6 |
| 2 | Spherical surface | 5.902 | 2.651 | | |
| 3 | Spherical surface | 30.898 | 0.810 | 1.84503 | 36.8 |
| 4 | Spherical surface | 4.409 | 5.457 | | |
| 5 | Spherical surface | −15.947 | 12.000 | 1.84501 | 36.9 |
| 6 | Spherical surface | 136.496 | 4.939 | | |
| 7 | Flat surface | Diaphragm | 0.500 | | |
| 8 | XY polynomial surface | 22.458 | 2.016 | 1.84528 | 35.9 |
| 9 | XY polynomial surface | 9.189 | 4.495 | | |
| 10 | Spherical surface | 6.483 | 0.800 | 1.85000 | 24.0 |
| 11 | Spherical surface | 4.006 | 4.226 | 1.48209 | 70.8 |
| 12 | Spherical surface | −5.416 | 0.150 | | |
| 13 | Spherical surface | −5.077 | 0.800 | 1.84995 | 24.0 |
| 14 | Spherical surface | 6.298 | 0.182 | | |
| 15 | Spherical surface | 7.735 | 3.808 | 1.61867 | 63.0 |
| 16 | Spherical surface | −5.939 | 0.150 | | |
| 17 | Anamorphic | 11.311 | 1.653 | 1.69536 | 44.0 |
| 18 | Anamorphic | −9.979 | 0.150 | | |
| 19 | XY polynomial surface | 3.319 | 1.296 | 1.84500 | 37.0 |
| 20 | XY polynomial surface | −3.017 | 0.738 | | |
| 21 | Flat surface | | 1.000 | 1.51680 | 64.2 |
| 22 | Flat surface | | 0.503 | | |

TABLE 19

| | |
|---|---|
| Focal length | 0.091 |
| F-number | 2.72 |
| Half angle of view | 90° |
| Front lens group focal length | −2.095 |
| Rear lens group focal length | 1.157 |
| Horizontal image height Yh | 2.371 |
| Vertical image height Yv | 1.838 |
| Diagonal image height Yd | 3.000 |

TABLE 20 s8

| | |
|---|---|
| C1 | 0.00000E+00 |
| C2 | 0.00000E+00 |
| C3 | 0.00000E+00 |
| C4 | 7.76549E−03 |
| C5 | 0.00000E+00 |
| C6 | 4.90048E−03 |
| C7 | 0.00000E+00 |
| C8 | 0.00000E+00 |
| C9 | 0.00000E+00 |
| C10 | 0.00000E+00 |
| C11 | 3.73948E−05 |
| C12 | 0.00000E+00 |
| C13 | 7.46029E−04 |
| C14 | 0.00000E+00 |
| C15 | −4.79948E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 8.60665E−06 |
| C23 | 0.00000E+00 |
| C24 | 5.90831E−05 |
| C25 | 0.00000E+00 |
| C26 | 4.63870E−05 |
| C27 | 0.00000E+00 |
| C28 | 6.90894E−06 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |

TABLE 20-continued s8

| | |
|---|---|
| C36 | 0.00000E+00 |
| C37 | 0.00000E+00 |
| C38 | 0.00000E+00 |
| C39 | 9.80774E−07 |
| C40 | 0.00000E+00 |
| C41 | 2.39618E−07 |
| C42 | 0.00000E+00 |
| C43 | −3.10476E−06 |
| C44 | 0.00000E+00 |
| C45 | −3.42719E−06 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 0.00000E+00 |
| C65 | 0.00000E+00 |
| C66 | 0.00000E+00 |

TABLE 21 s9

| | |
|---|---|
| C1 | 0.00000E+00 |
| C2 | 0.00000E+00 |
| C3 | 0.00000E+00 |
| C4 | −8.90433E−02 |
| C5 | 0.00000E+00 |
| C6 | −8.88034E−02 |
| C7 | 0.00000E+00 |
| C8 | 0.00000E+00 |
| C9 | 0.00000E+00 |
| C10 | 0.00000E+00 |
| C11 | 7.10894E−06 |
| C12 | 0.00000E+00 |
| C13 | 6.79306E−04 |
| C14 | 0.00000E+00 |
| C15 | −5.40495E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 9.47704E−06 |
| C23 | 0.00000E+00 |
| C24 | 6.17054E−05 |
| C25 | 0.00000E+00 |
| C26 | 4.45996E−05 |
| C27 | 0.00000E+00 |
| C28 | 1.15611E−05 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.10699E−07 |
| C38 | 0.00000E+00 |
| C39 | 6.85515E−07 |

TABLE 21-continued s9

| | |
|---|---|
| C40 | 0.00000E+00 |
| C41 | −4.41010E−07 |
| C42 | 0.00000E+00 |
| C43 | −4.00868E−06 |
| C44 | 0.00000E+00 |
| C45 | −4.18443E−06 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 1.38411E−08 |
| C65 | 0.00000E+00 |
| C66 | 7.47187E−08 |

TABLE 22 s19

| | |
|---|---|
| C1 | 0.00000E+00 |
| C2 | 0.00000E+00 |
| C3 | 0.00000E+00 |
| C4 | −1.20397E−01 |
| C5 | 0.00000E+00 |
| C6 | −6.54939E−02 |
| C7 | 0.00000E+00 |
| C8 | 0.00000E+00 |
| C9 | 0.00000E+00 |
| C10 | 0.00000E+00 |
| C11 | −1.99786E−03 |
| C12 | 0.00000E+00 |
| C13 | 1.92007E−03 |
| C14 | 0.00000E+00 |
| C15 | −1.53329E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 4.03535E−04 |
| C23 | 0.00000E+00 |
| C24 | 2.66743E−03 |
| C25 | 0.00000E+00 |
| C26 | 4.39314E−03 |
| C27 | 0.00000E+00 |
| C28 | −1.81620E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −9.33639E−05 |
| C38 | 0.00000E+00 |
| C39 | −6.12069E−04 |
| C40 | 0.00000E+00 |
| C41 | −2.29976E−03 |
| C42 | 0.00000E+00 |
| C43 | −9.11127E−04 |

TABLE 22-continued s19

| | |
|---|---|
| C44 | 0.00000E+00 |
| C45 | 7.78753E−07 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −1.66635E−10 |
| C57 | 0.00000E+00 |
| C58 | 3.72801E−06 |
| C59 | 0.00000E+00 |
| C60 | 1.47466E−04 |
| C61 | 0.00000E+00 |
| C62 | 1.72567E−04 |
| C63 | 0.00000E+00 |
| C64 | 7.33597E−06 |
| C65 | 0.00000E+00 |
| C66 | −6.34301E−08 |

TABLE 23 s20

| | |
|---|---|
| C1 | 0.00000E+00 |
| C2 | 0.00000E+00 |
| C3 | 0.00000E+00 |
| C4 | 1.92365E−01 |
| C5 | 0.00000E+00 |
| C6 | 3.57284E−01 |
| C7 | 0.00000E+00 |
| C8 | 0.00000E+00 |
| C9 | 0.00000E+00 |
| C10 | 0.00000E+00 |
| C11 | 1.26449E−02 |
| C12 | 0.00000E+00 |
| C13 | 4.63274E−02 |
| C14 | 0.00000E+00 |
| C15 | −2.12380E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 2.05620E−03 |
| C23 | 0.00000E+00 |
| C24 | 1.44061E−02 |
| C25 | 0.00000E+00 |
| C26 | 2.03341E−02 |
| C27 | 0.00000E+00 |
| C28 | −6.39369E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 1.13956E−08 |
| C38 | 0.00000E+00 |
| C39 | 5.30869E−08 |
| C40 | 0.00000E+00 |
| C41 | 1.14459E−07 |
| C42 | 0.00000E+00 |
| C43 | −3.64398E−03 |
| C44 | 0.00000E+00 |
| C45 | 2.32482E−04 |
| C46 | 0.00000E+00 |
| C47 | 0.00000E+00 |

TABLE 23-continued

| s20 | |
|---|---|
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 0.00000E+00 |
| C57 | 0.00000E+00 |
| C58 | 0.00000E+00 |
| C59 | 0.00000E+00 |
| C60 | 0.00000E+00 |
| C61 | 0.00000E+00 |
| C62 | 0.00000E+00 |
| C63 | 0.00000E+00 |
| C64 | 0.00000E+00 |
| C65 | 0.00000E+00 |
| C66 | 0.00000E+00 |

TABLE 24

| s17 | |
|---|---|
| CUX | −39.218 |
| CUY | 11.311 |

TABLE 25

| s18 | |
|---|---|
| CUX | −6.854 |
| CUY | −9.979 |

Table 26 below shows values corresponding to Conditions (1) through (4) for the lens systems according to the respective numerical examples.
(Values Corresponding to Conditions)

TABLE 26

| | Numerical example 1 | Numerical example 2 | Numerical example 3 | Numerical example 4 |
|---|---|---|---|---|
| Condition (1) | 11.7 | 26.8 | 13.0 | 27.9 |
| Condition (2) | 23.7 | 583.6 | 22.2 | 86.5 |
| Condition (3) | 49.0 | 188.2 | 16.3 | 90.7 |
| Condition (4) | 0.447 | 0.463 | 0.455 | 0.409 |

The lens system according to the present disclosure is applicable to, for example, a digital still camera, a digital camcorder, a camera in a mobile phone, a camera in a personal digital assistance (PDA), a monitoring camera in a monitoring system, a webcam, and an onboard camera, and is suitable especially as an image capturing optical system such as a digital still camera system and a digital camcorder system of which high quality is required.

The lens system according to the present disclosure is included in, among interchangeable lens devices according to the present disclosure, a digital camcorder system.

What is claimed is:
1. A lens system which includes a lens group including at least one lens element and forms an image on an image sensor which is rectangular with a first side and a second side greater than or equal to the first side in length, the lens system comprising:
in order from an object side to an image surface side,
a front lens group;
a diaphragm; and
a rear lens group, wherein
at least one of the front lens group and the rear lens group includes a freeform surface lens asymmetric about an optical axis, and
the lens system satisfies Condition (1) and Condition (2) below when an axis passing through the optical axis and parallel to the first side is a vertical axis, an axis passing through the optical axis and parallel to the second side is a horizontal axis, and an axis passing through the optical axis and parallel to a line diagonally joining opposite corners of the image sensor is a diagonal axis,

$$1 < A/(B-C) < 10000 \tag{1}$$

$$1 < A/(D-E) < 10000 \tag{2}$$

where:
A is a value represented by [Math. 1];

$$\sum_{i=1}^{n} (ndi \cdot Lcci) \qquad [\text{Math. 1}]$$

B is a value represented by [Math. 2];

$$\sum_{i=m+1}^{n} \{(ndi \cdot Lhvi) - (ndi \cdot Lvvi)\} \qquad [\text{Math. 2}]$$

C is a value represented by [Math. 3];

$$\sum_{i=1}^{m} \{(ndi \cdot Lhvi) - (ndi \cdot Lvvi)\} \qquad [\text{Math. 3}]$$

D is a value represented by [Math. 4];

$$\sum_{i=m+1}^{n} \{(ndi \cdot Ldhi) - (ndi \cdot Lhei)\} \qquad [\text{Math. 4}]$$

E is a value represented by [Math. 5];

$$\sum_{i=1}^{m} \{(ndi \cdot Ldhi) - (ndi \cdot Lhei)\} \qquad [\text{Math. 5}]$$

i is a number, indicating a position, of a freeform surface lens when freeform surface lenses are counted in order from the object side to the image surface side;
m is a number of freeform surface lenses located between an object and the diaphragm;
n is a total number of freeform surface lenses;
Lcci is a distance in an i-th freeform surface lens travelled by a principal ray forming an image at a center of the image sensor;
Lhvi is a distance in the i-th freeform surface lens travelled by a principal ray forming an image at a position away from the optical axis by Yv along the horizontal axis of the image sensor;

Lvvi is a distance in the i-th freeform surface lens travelled by a principal ray forming an image at a position away from the optical axis by Yv along the vertical axis of the image sensor;

Ldhi is a distance in the i-th freeform surface lens travelled by a principal ray forming an image at a position away from the optical axis by Yh along the diagonal axis of the image sensor;

Lhei is a distance in the i-th freeform surface lens travelled by a principal ray forming an image at a position away from the optical axis by Ye along the horizontal axis of the image sensor;

ndi is a refractive index of the i-th freeform surface lens with respect to d line;

Yv is a distance from the optical axis to the second side of the image sensor;

Yh is a distance from the optical axis to the first side of the image sensor; and $$Ye=\sqrt{((Yv^2+Yh^2)/2)}.$$

2. The lens system according to claim 1, wherein the lens system satisfies Condition (3) below $$1<A/(F-G)<10000 \qquad (3)$$

where:

F is a value represented by [Math. 6];

$$\sum_{i=m+1}^{n} \{(ndi \cdot Ldhi) - (ndi \cdot Lhhi)\} \qquad [\text{Math. 6}]$$

G is a value represented by [Math. 7];

$$\sum_{i=1}^{m} \{(ndi \cdot Ldhi) - (ndi \cdot Lhhi)\} \qquad [\text{Math. 7}]$$

and

Lhhi is a distance in the i-th freeform surface lens travelled by a principal ray forming an image at a position away from the optical axis by Yh along the horizontal axis of the image sensor.

3. The lens system according to claim 1, comprising at least two lens elements which are axially symmetric about the optical axis.

4. The lens system according to claim 1, wherein each of the front lens group and the rear lens group includes at least one freeform surface lens.

5. The lens system according to claim 1, wherein the freeform surface lens has a shape symmetric about the horizontal axis and the vertical axis.

6. The lens system according to claim 1, wherein the front lens group includes a freeform surface lens, and a principal curvature of the freeform surface lens included in the front lens group has negative power.

7. The lens system according to claim 1, wherein the rear lens group includes a freeform surface lens, and a principal curvature of the freeform surface lens included in the rear lens group has positive power.

8. The lens system according to claim 1, wherein the front lens group includes, in order from the object side to the image surface side, a meniscus-shaped first lens element having negative power and having a convex shape on the object side, and a meniscus-shaped second lens element having negative power and having a convex shape on the object side.

9. The lens system according to claim 1, wherein the lens system satisfies Condition (4) below $$0.1<Lsi/Ltt<0.7 \qquad (4)$$

where:

Lsi is a distance from the diaphragm to an image surface; and

Ltt is a distance from a lens surface located closest to the object to the image surface.

10. The lens system according to claim 1, wherein both surfaces of a freeform surface lens located closest to an image surface and having a principal curvature with positive power are freeform surfaces.

11. The lens system according to claim 1, wherein the lens system is a fisheye lens system.

12. A camera system comprising:
a lens system which includes a lens group including at least one lens element; and
an image sensor which is rectangular with a first side and a second side greater than or equal to the first side in length, wherein
the lens system includes:
in order from an object side to an image surface side,
a front lens group;
a diaphragm; and
a rear lens group,
at least one of the front lens group and the rear lens group includes a freeform surface lens asymmetric about an optical axis, and
the lens system satisfies Condition (1) and Condition (2) below when an axis passing through the optical axis and parallel to the first side is a vertical axis, an axis passing through the optical axis and parallel to the second side is a horizontal axis, and an axis passing through the optical axis and parallel to a line diagonally joining opposite corners of the image sensor is a diagonal axis, $$1<A/(B-C)<10000 \qquad (1)$$

$$1<A/(D-E)<10000 \qquad (2)$$

where:

A is a value represented by [Math. 1];

$$\sum_{i=1}^{n} (ndi \cdot Lcci) \qquad [\text{Math. 1}]$$

B is a value represented by [Math. 2];

$$\sum_{i=m+1}^{n} \{(ndi \cdot Lhvi) - (ndi \cdot Lvvi)\} \qquad [\text{Math. 2}]$$

C is a value represented by [Math. 3];

$$\sum_{i=1}^{m} \{(ndi \cdot Lhvi) - (ndi \cdot Lvvi)\} \qquad [\text{Math. 3}]$$

D is a value represented by [Math. 4];

$$\sum_{i=m+1}^{n} \{(ndi \cdot Ldhi) - (ndi \cdot Lhei)\} \quad \text{[Math. 4]}$$

E is a value represented by [Math. 5];

$$\sum_{i=1}^{m} \{(ndi \cdot Ldhi) - (ndi \cdot Lhei)\} \quad \text{[Math. 5]}$$

i is a number, indicating a position, of a freeform surface lens when freeform surface lenses are counted in order from the object side to the image surface side;
m is a number of freeform surface lenses located between an object and the diaphragm;
n is a total number of freeform surface lenses;
Lcci is a distance in an i-th freeform surface lens travelled by a principal ray forming an image at a center of the image sensor;
Lhvi is a distance in the i-th freeform surface lens travelled by a principal ray forming an image at a position away from the optical axis by Yv along the horizontal axis of the image sensor;
Lvvi is a distance in the i-th freeform surface lens travelled by a principal ray forming an image at a position away from the optical axis by Yv along the vertical axis of the image sensor;
Ldhi is a distance in the i-th freeform surface lens travelled by a principal ray forming an image at a position away from the optical axis by Yh along the diagonal axis of the image sensor;
Lhei is a distance in the i-th freeform surface lens travelled by a principal ray forming an image at a position away from the optical axis by Ye along the horizontal axis of the image sensor;
ndi is a refractive index of the i-th freeform surface lens with respect to d line;
Yv is a distance from the optical axis to the second side of the image sensor;
Yh is a distance from the optical axis to the first side of the image sensor; and $Ye = \sqrt{((Yv^2 + Yh^2)/2)}$.

* * * * *